US012595847B2

(12) United States Patent
Lebrun et al.

(10) Patent No.: US 12,595,847 B2
(45) Date of Patent: Apr. 7, 2026

(54) ENERGIZING ELEMENT AND METHODS OF MAKING AND USING THE SAME

(71) Applicant: SAINT-GOBAIN PERFORMANCE PLASTICS CORPORATION, Solon, OH (US)

(72) Inventors: Jean-Marie Lebrun, Versailles (FR); Curtis Robie, Tustin, CA (US); Herman M. Dubois, Duffel (BE); Beatrice De Gennaro, Dardilly (FR); Michiel Keeris, Antwerp (BE); Mark W. Armitage, Madison, CT (US); Tong Jiao, Cumberland, RI (US); Xiang Yan, Barrington, RI (US); Peter Aerts, Ruisbroek (BE); Gino L. Stevenheydens, Willebroek (BE); Jian Ma, Shanghai (CN); Jay C. Cooper, Huntington Beach, CA (US); Colby Stark, Irvine, CA (US); Sergio Gabarre, Brussels (BE); J. Alex Lee, Wilmington, MA (US)

(73) Assignee: SAINT-GOBAIN PERFORMANCE PLASTICS CORPORATION, Malvern, PA (US)

( * ) Notice: Subject to any disclaimer, the term of this patent is extended or adjusted under 35 U.S.C. 154(b) by 0 days.

(21) Appl. No.: 18/667,660

(22) Filed: May 17, 2024

(65) Prior Publication Data

US 2024/0384792 A1    Nov. 21, 2024

Related U.S. Application Data

(60) Provisional application No. 63/503,048, filed on May 18, 2023.

(51) Int. Cl.
*F16J 15/02* (2006.01)
*F16F 1/02* (2006.01)
*F16F 1/373* (2006.01)

(52) U.S. Cl.
CPC ............. *F16J 15/022* (2013.01); *F16F 1/025* (2013.01); *F16F 1/373* (2013.01); *F16F 2234/02* (2013.01)

(58) Field of Classification Search
CPC ........ F16F 1/373; F16F 2234/02; F16F 1/025; F16J 15/022
See application file for complete search history.

(56) References Cited

U.S. PATENT DOCUMENTS 1,924,555 A    8/1933  Hubbard
2,342,458 A    2/1944  Davies
        (Continued)

FOREIGN PATENT DOCUMENTS

CN    102481681  B    7/2014
CN    104565151  A    4/2015
        (Continued)

OTHER PUBLICATIONS

International Search Report and Written Opinion for PCT Application No. PCT/US2024/030013, mailed Sep. 6, 2024, 12 pages.
(Continued)

*Primary Examiner* — Eugene G Byrd
(74) *Attorney, Agent, or Firm* — Abel Schillinger, LLP; Ann Palma

(57) ABSTRACT

An energizing element including: an energizing element body oriented about a central axis, the energizing element body defining an inner radius, IR, and an outer radius, OR, where the difference between the outer radius and the inner radius defines an adjusted width, W, of the energizing element body, where the inner radius and the outer radius
(Continued)

determine an average radius, R, of the energizing element body about the central axis, where the energizing element body defines an aspect ratio, W/R, where W/R>0.1, where the energizing element body has a maximum linear contact length on the inner radius, $L_{IR}$, where the energizing element body has a perimeter on the inner radius, $P_{IR}$, and $L_{IR}/P_{IR}>0.80$, where the energizing element body has a maximum linear contact length on the outer radius, $L_{OR}$, where the energizing element body has a perimeter on the outer radius, $P_{OR}$, and $L_{OR}/P_{OR}>0.55$, and where the adjusted width is less than 5 mm.

20 Claims, 7 Drawing Sheets

(56) References Cited

U.S. PATENT DOCUMENTS

| | | | | |
|---|---|---|---|---|
| 2,434,484 | A | 1/1948 | Chambers | |
| 3,223,426 | A * | 12/1965 | Reid | F16J 15/121 |
| | | | | 277/467 |
| 3,653,670 | A * | 4/1972 | Sifri | B29C 33/005 |
| | | | | 277/467 |
| 4,133,542 | A | 1/1979 | Janian et al. | |
| 4,173,878 | A | 11/1979 | Nemets et al. | |
| 4,175,758 | A | 11/1979 | Adamovich et al. | |
| 4,508,356 | A | 4/1985 | Janian | |
| 4,655,462 | A * | 4/1987 | Balsells | F16F 1/045 |
| | | | | 267/167 |
| 4,934,666 | A * | 6/1990 | Balsells | H05K 9/0015 |
| | | | | 174/370 |
| 5,799,953 | A * | 9/1998 | Henderson | F16J 15/3236 |
| | | | | 277/567 |
| 5,984,316 | A * | 11/1999 | Balsells | F16J 15/3216 |
| | | | | 277/553 |
| 6,098,989 | A | 8/2000 | Caplain et al. | |
| 8,251,373 | B2 * | 8/2012 | Lev | H01M 8/04089 |
| | | | | 277/456 |
| 9,010,740 | B2 | 4/2015 | Jaster | |
| 9,182,041 | B2 | 11/2015 | Daub et al. | |
| 9,341,223 | B2 | 5/2016 | Suzuki et al. | |
| 10,535,945 | B2 | 1/2020 | Dilmaghanian et al. | |
| 10,598,241 | B2 * | 3/2020 | Poon | F16J 15/16 |
| 10,605,367 | B2 | 3/2020 | Tokunaga | |
| 10,737,310 | B2 | 8/2020 | Watanabe | |
| 11,802,646 | B2 | 10/2023 | Furcoiu | |
| 2009/0243225 | A1 | 10/2009 | Matsushima et al. | |
| 2010/0110840 | A1 | 5/2010 | Zaugg et al. | |

| | | | | |
|---|---|---|---|---|
| 2011/0263164 | A1 * | 10/2011 | Lenhert | H01R 13/33 |
| | | | | 267/167 |
| 2013/0043660 | A1 | 2/2013 | Daub et al. | |
| 2015/0316115 | A1 | 11/2015 | Carter | |
| 2016/0319936 | A1 * | 11/2016 | Dubois | F16J 15/3212 |
| 2018/0266562 | A1 | 9/2018 | Balsells | |
| 2018/0327919 | A1 | 11/2018 | Kim et al. | |
| 2018/0335145 | A1 | 11/2018 | Tokunaga | |
| 2018/0354017 | A1 | 12/2018 | Watanabe | |
| 2021/0041052 | A1 | 2/2021 | Furcoiu | |
| 2021/0254716 | A1 * | 8/2021 | Burlot | F16J 15/3236 |
| 2022/0349475 | A1 * | 11/2022 | Nguyen | F16J 15/3212 |
| 2023/0027214 | A1 | 1/2023 | Zlebek et al. | |
| 2023/0126994 | A1 * | 4/2023 | Stark | F16J 15/3232 |
| | | | | 277/549 |
| 2023/0213097 | A1 * | 7/2023 | Morrow | F16J 15/3452 |
| | | | | 277/589 |
| 2023/0375088 | A1 | 11/2023 | Stevenheydens et al. | |

FOREIGN PATENT DOCUMENTS

| | | | | | |
|---|---|---|---|---|---|
| CN | 105202089 | A | | 12/2015 | |
| CN | 106392473 | A | | 2/2017 | |
| CN | 206190907 | U | | 5/2017 | |
| CN | 206694480 | A | | 12/2017 | |
| CN | 110121407 | A | | 8/2019 | |
| CN | 110594327 | A | | 12/2019 | |
| CN | 108561553 | B | | 6/2020 | |
| EP | 2559922 | A1 | | 2/2013 | |
| EP | 3217046 | A1 | | 9/2017 | |
| JP | S5754764 | U | | 3/1982 | |
| JP | 04266664 | A | * | 12/1991 | |
| JP | 0721968 | Y2 | | 5/1995 | |
| JP | 2002212770 | A | | 7/2002 | |
| JP | 2009002309 | A | | 1/2009 | |
| JP | 2013040683 | A | | 2/2013 | |
| JP | 6216805 | B2 | | 10/2017 | |
| JP | 6471001 | B2 | | 2/2019 | |
| KR | 101461373 | B1 | | 11/2014 | |
| NL | 9300593 | A | * | 11/1994 | F16J 15/025 |
| WO | WO-02079676 | A2 | * | 10/2002 | F16J 15/002 |
| WO | 2008155864 | A1 | | 12/2008 | |
| WO | 2011072192 | A1 | | 6/2011 | |
| WO | 2017221653 | A1 | | 4/2019 | |
| WO | 2023225179 | A1 | | 11/2023 | |
| WO | 2024238954 | A1 | | 11/2024 | |

OTHER PUBLICATIONS

International Search Report and Written Opinion for PCT Application No. PCT/US2023/022710, mailed Sep. 8, 2023, 12 pages.

* cited by examiner

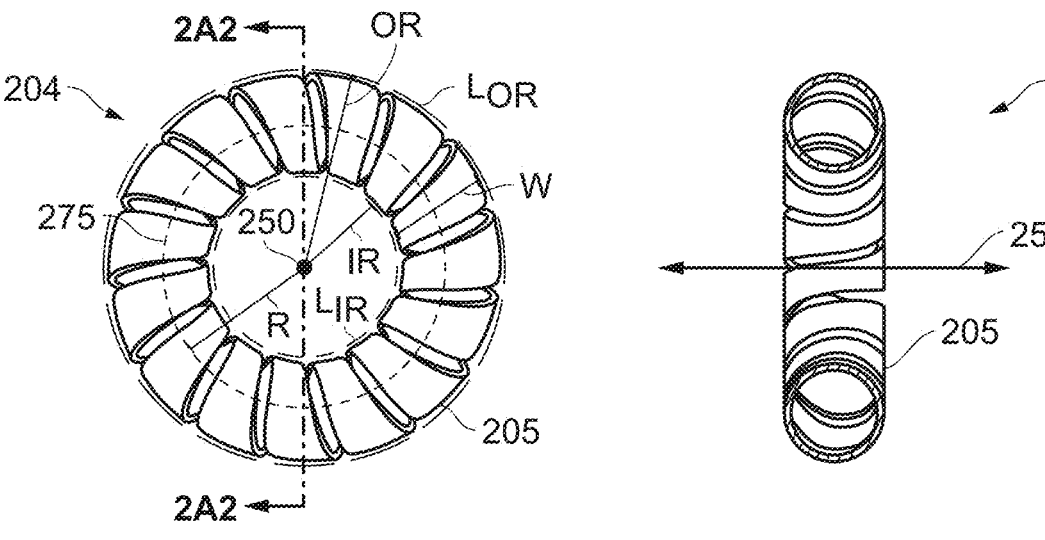
FIG. 2A1                    FIG. 2A2
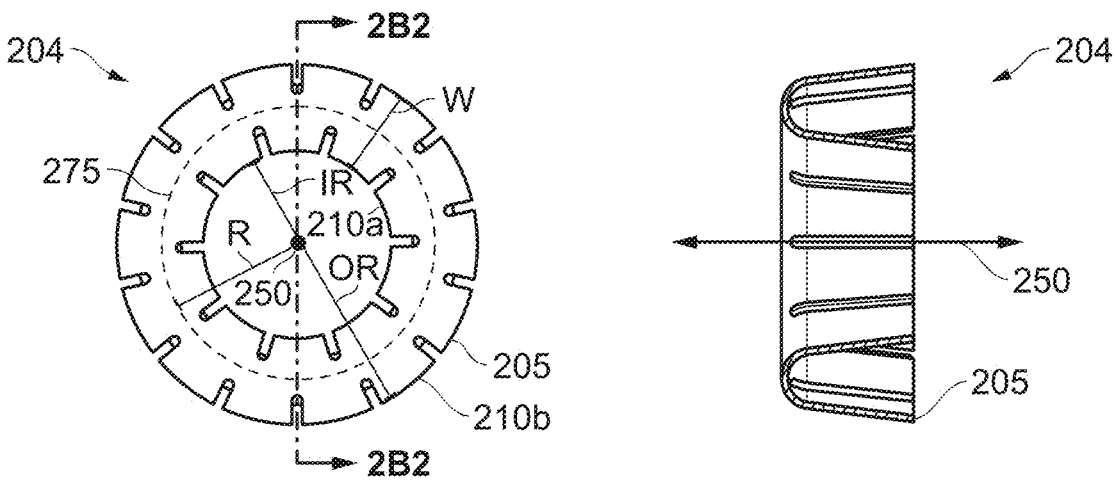
FIG. 2B1                    FIG. 2B2
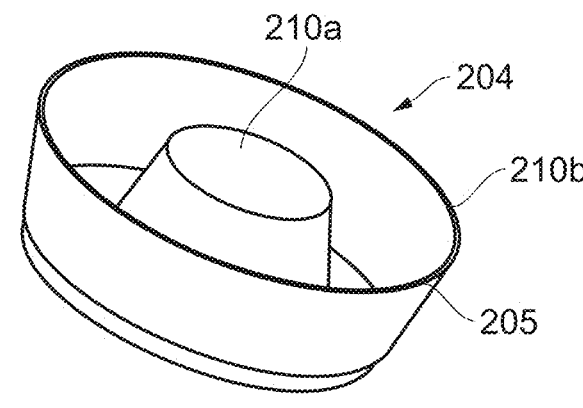
FIG. 2B3

ENERGIZING ELEMENT AND METHODS OF MAKING AND USING THE SAME

CROSS-REFERENCE TO RELATED APPLICATION(S)

This application claims priority under 35 U.S.C. § 119(e) to U.S. Provisional Application No. 63/503,048, entitled "ENERGIZING ELEMENT AND METHODS OF MAKING AND USING THE SAME," by Jean-Marie LEBRUN et al., filed May 18, 2023, which is assigned to the current assignee hereof and incorporated herein by reference in its entirety.

FIELD OF THE DISCLOSURE

The present disclosure relates to energizing elements, and more particularly to energizing elements diminutive in size and methods of making and using the same.

BACKGROUND

Energizing elements (e.g. springs) are used in a plurality of applications to provide appropriate loads on neighboring components including, but not limiting to seals applications. Seals are employed in environments to segregate fluids (liquids, gases, slurries, etc.) from one another. Under pressure conditions, current energizing elements may lack design customization and flexibility in desired load ranges and under desired conditions in applications such as seals. Further, sizing can be difficult to achieve with energizing elements on the micro-scale and below, exacerbating the above difficulties. Therefore, the industry continues to demand improved energizing elements for desired conditions, load ranges, and sizing in a number of applications.

SUMMARY

Embodiments herein may include an energizing element including: an energizing element body oriented about a central axis, the energizing element body defining an inner radius, IR, and an outer radius, OR, where the difference between the outer radius and the inner radius defines an adjusted width, W, of the energizing element body, where the inner radius and the outer radius determine an average radius, R, of the energizing element body about the central axis, where the energizing element body defines an aspect ratio, W/R, where W/R>0.1, where the energizing element body has a maximum linear contact length on the inner radius, $L_{IR}$, where the energizing element body has a perimeter on the inner radius, $P_{IR}$, and $L_{IR}/P_{IR}>0.80$, where the energizing element body has a maximum linear contact length on the outer radius, $L_{OR}$, where the energizing element body has a perimeter on the outer radius, $P_{OR}$, and $L_{OR}/P_{OR}>0.55$, and where the adjusted width is less than 5 mm.

Embodiments herein may include an energizing element including: an energizing element body oriented about a central axis, the energizing element body defining an inner radius, IR, and an outer radius, OR, where the difference between the outer radius and the inner radius defines an adjusted width, W, of the energizing element body, where the inner radius and the outer radius determine an average radius, R, of the energizing element body about the central axis, where the energizing element body defines an aspect ratio, W/R, where W/R>0.2, where the energizing element body has a maximum linear contact length on the inner radius, $L_{IR}$, where the energizing element body has a perimeter on the inner radius, $P_{IR}$, and $L_{IR}/P_{IR}>0.74$, where the energizing element body has a maximum linear contact length on the outer radius, $L_{OR}$, where the energizing element body has a perimeter on the outer radius, $P_{OR}$, and $L_{OR}/P_{OR}>0.38$, and where the adjusted width is less than 5 mm.

Embodiments herein may include a seal including: an annular jacket including a body defining an annular recess; and an energizing element disposed within the annular recess, the energizing element including: an energizing element body oriented about a central axis, the energizing element body defining an inner radius, IR, and an outer radius, OR, where the difference between the outer radius and the inner radius defines an adjusted width, W, of the energizing element body, where the inner radius and the outer radius determine an average radius, R, of the energizing element body about the central axis, where the energizing element body defines an aspect ratio, W/R, where W/R>0.1, where the energizing element body has a maximum linear contact length on the inner radius, $L_{IR}$, where the energizing element body has a perimeter on the inner radius, $P_{IR}$, and $L_{IR}/P_{IR}>0.80$, where the energizing element body has a maximum linear contact length on the outer radius, $L_{OR}$, where the energizing element body has a perimeter on the outer radius, $P_{OR}$, and $L_{OR}/P_{OR}>0.55$, and where the adjusted width is less than 5 mm.

Embodiments herein may include a seal including: an annular jacket including a body defining an annular recess; and an energizing element disposed within the annular recess, the energizing element including: an energizing element body oriented about a central axis, the energizing element body defining an inner radius, IR, and an outer radius, OR, where the difference between the outer radius and the inner radius defines an adjusted width, W, of the energizing element body, where the inner radius and the outer radius determine an average radius, R, of the energizing element body about the central axis, where the energizing element body defines an aspect ratio, W/R, where W/R>0.2, where the energizing element body has a maximum linear contact length on the inner radius, $L_{IR}$, where the energizing element body has a perimeter on the inner radius, $P_{IR}$, and $L_{IR}/P_{IR}>0.74$, where the energizing element body has a maximum linear contact length on the outer radius, $L_{OR}$, where the energizing element body has a perimeter on the outer radius, $P_{OR}$, and $L_{OR}/P_{OR}>0.38$, and where the adjusted width is less than 5 mm.

Embodiments herein may include a method including: providing a filament; and manipulating the filament to form an energizing element body oriented about a central axis, the energizing element body defining an inner radius, IR, and an outer radius, OR, where the difference between the outer radius and the inner radius defines an adjusted width, W, of the energizing element body, where the inner radius and the outer radius determine an average radius, R, of the energizing element body about the central axis, where the energizing element body defines an aspect ratio, W/R, where W/R>0.1, where the energizing element body has a maximum linear contact length on the inner radius, $L_{IR}$, where the energizing element body has a perimeter on the inner radius, $P_{IR}$, and $L_{IR}/P_{IR}>0.80$, where the energizing element body has a maximum linear contact length on the outer radius, $L_{OR}$, where the energizing element body has a perimeter on the outer radius, $P_{OR}$, and $L_{OR}/P_{OR}>0.55$, and where the adjusted width is less than 5 mm.

Embodiments herein may include a method including: providing a filament; and manipulating the filament to form an energizing element body oriented about a central axis, the energizing element body defining an inner radius, IR, and an outer radius, OR, where the difference between the outer radius and the inner radius defines an adjusted width, W, of the energizing element body, where the inner radius and the outer radius determine an average radius, R, of the energizing element body about the central axis, where the energizing element body defines an aspect ratio, W/R, where W/R>0.2, where the energizing element body has a maximum linear contact length on the inner radius, $L_{IR}$, where the energizing element body has a perimeter on the inner radius, $P_{IR}$, and $L_{IR}/P_{IR}$>0.74, where the energizing element body has a maximum linear contact length on the outer radius, $L_{OR}$, where the energizing element body has a perimeter on the outer radius, $P_{OR}$, and $L_{OR}/P_{OR}$>0.38, and where the adjusted width is less than 5 mm.

BRIEF DESCRIPTION OF THE DRAWINGS

Embodiments are illustrated by way of example and are not intended to be limited in the accompanying figures.

FIG. 2A1 includes an overhead view of an exemplary energizing element according to a number of embodiments.

FIG. 2A2 includes a cross-sectional side view of an exemplary energizing element according to a number of embodiments.

FIG. 2B1 includes an overhead view of an exemplary energizing element according to a number of embodiments.

FIG. 2B2 includes a cross-sectional side view of an exemplary energizing element according to a number of embodiments.

FIG. 2B3 includes a side perspective view of an exemplary energizing element according to a number of embodiments.

FIG. 2C includes an overhead perspective view of an exemplary energizing element according to a number of embodiments.

FIG. 2D includes an overhead perspective view of an exemplary energizing element according to a number of embodiments.

FIG. 2F includes a side cross-sectional view of an energizing element according to a number of embodiments.

FIG. 2G includes a cross-sectional view of an energizing element according to a number of embodiments.

FIG. 2I includes a top view of an energizing element according to a number of embodiments.

FIG. 2J includes a top view of an energizing element according to a number of embodiments.

FIG. 3 includes a graphical representation of linear contact coverage on the inner radius and the outer radius, $H_{IR}$, $H_{OR}$, as a function of spring aspect ratio, AR, for energizing elements according to a number of embodiments compared to prior art energizing elements.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the energizing element arts.

Figure 1:
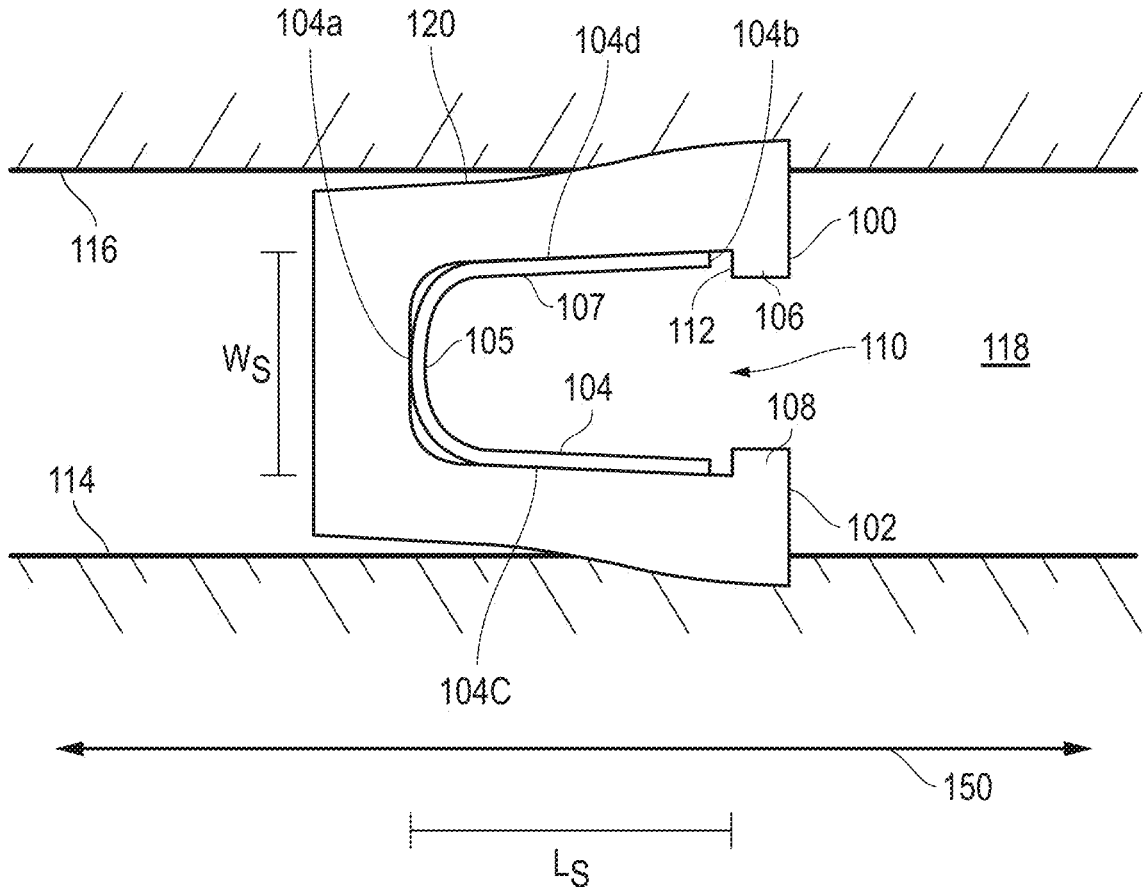
FIG. 1 includes a cross-sectional perspective view of a seal including an energizing element in accordance with an embodiment.

FIG. 1 illustrates a seal including an energizing element in accordance with an embodiment. Referring to FIG. 1, a seal 100 can generally include a jacket 102 and an energizing element 104. The jacket 102 may include tabs 106 and 108 defining a recess 110. The energizing element 104 may be disposed within the recess 110, such as partially disposed in the recess 110 or entirely disposed in the recess 110. In an embodiment, at least one of the tabs 106 and 108 may include a distal flange 112 extending toward the recess 110. The distal flange 112 may prevent dislodgment of the energizing element 104 from the recess 110. Any of these components may be formed in an annular orientation. Although FIG. 1 illustrates the seal 100 in an axial orientation, the seal 100 could be oriented in any potential orientation including radial or face sealing orientations. As described herein, the energizing element 104 may be used in seal applications, but is not necessarily limited to seals applications.

In accordance with certain embodiments, as shown in FIG. 1, the seal 100 may be used between inner and outer components 114 and 116, such as a shaft and a bore, respectively. More particularly, the seal 100 may be disposed within an annulus formed by an area within a bore of the outer component 116 and an outer surface of the inner component 114. In certain embodiments, the inner component 114 may longitudinally translate, e.g., reciprocate, relative to the outer component 116. In other embodiments, the inner component 114 may rotate relative to the outer component 116. Alternatively, in certain embodiments, the outer component 116 may longitudinally translate, e.g., reciprocate, relative to the inner component 114. In other embodiments, the outer component 116 may rotate relative to the inner component 114. The seal 100 may prevent or reduce ingress or egress of one or more fluidic components from a first side of the seal to a second, opposite side thereof.

In a number of embodiments, the seal 100 (or any of its components) may have a radial tolerance of at least 0.1 mm, such as at least 0.2 mm, at least 0.3 mm, at least 0.4 mm, at least 0.5 mm, at least 1 mm, at least 2 mm, at least 3 mm, at least 4 mm, or even at least 5 mm. As used herein, "radial tolerance" refers to the seal's ability to absorb manufacturing and installation tolerances between shaft and bore (or inner and outer components). Traditional seals are unable to absorb tolerances as they require precise machining and manufacturing tolerances (specifically in the axial direction relative to the seal) and thus are not adapted to readily deform and accommodate unanticipated manufacturing and installation tolerances.

The energizing element 104 may include an energizing element body 105 adapted to provide an outwardly biasing force in at least one outwardly oriented direction, such as toward at least one of the tabs 106 and 108. In a number of embodiments, the energizing element 104 may provide a radial biasing force against the jacket of between 0.01 N/mm and 1000 N/mm.

In an embodiment, as described in further detail below the energizing element 104 may have an O-shaped or at least partially circular cross-sectional profile in the axial direction. In an embodiment, the energizing element 104 may have an oval cross-sectional profile in the axial direction. In an embodiment, the energizing element 104 may have a polygonal cross-sectional profile in the axial direction. In another embodiment, the energizing element 104 may have a cross-sectional profile selected from a D-shape, a U-shape, a V-shape, or a C-shape in the axial direction, as described in further detail below. In a particular embodiment, the energizing element 104 may have a cantilevered profile where surfaces of the energizing element 104 extend in a manner adjacent to at least one of the tabs 106 or 108. The cantilevered portions of the energizing element 104 may outwardly bias the tabs 106 and 108 apart from one another.

In an embodiment, the energizing element 104 may extend around at least a part of the entire circumference of the seal 100. In a more particular embodiment, the energizing element 104 may have a uniform shape and material characteristic around the entire circumference of the seal 100. In another more particular embodiment, the energizing element 104 may have a varying shape or material selection around the circumference of the seal 100. In another embodiment, the energizing element 104 may extend around only a portion of the circumference of the seal 100. In a number of embodiments, the energizing element 104 may extend around the entirety of the circumference of the seal 100. In a number of embodiments, the energizing element 104 may not be welded. In a more particular embodiment, the energizing element 104 may comprise a plurality of energizing elements 104 at least partially spaced apart from one another. In such embodiment, there may be a circumferential space between adjacent energizing elements 104. It is contemplated herein that any of the embodiments of energizing elements 104 herein may be included within a jacket 102 of the seal 100 with at least one other of the energizing elements 104 of any of the embodiments of energizing elements 104 listed herein, in any orientation within the jacket 102 of the seal 100.

In a number of embodiments, the energizing element 104 may include a body 105 including a filament 107. The filament 107 may be an annular filament oriented about a central axis 150 as shown in more detail below. The filament 107 may include a plurality of oscillations generally directed down the central axis 150 as described in further detail below. In some embodiments, the filament 107 may be a wire. The wire may be rectangular, square, circular, elliptical, or keystone in cross section. In some embodiments, the filament 107 may have an arcuate cross section. The filament 207 may be turned at a pitch of between 0.025 mm and 25.4 mm, such as between 0.05 mm and 10 mm. The filament 107 may have a filament diameter of between 0.01 mm and 25.4 mm, such as between 0.05 mm and 5 mm. The filament 107 may have an energizing element diameter of between 0.05 mm and 5000 mm, such as between 0.1 mm and 3000 mm. The energizing element 104 may have a spring load of between 0.01 N/mm to 20 N/mm, such as 0.5 N/mm to 15 N/mm, such as 1 N/mm to 10 N/mm, or such as 2.5 N/mm to 7.5 N/mm.

In some embodiments, the filament 107 may be coiled or wrapped so as to form a generally O-shaped cross section in the axial direction. In yet another instance, the energizing element 104 may include a ribbon wrapped so as to form a generally O-shaped cross section in the axial direction as shown in more detail below. In a particular embodiment, the ribbon may have two major surfaces spaced apart from each other by a thickness. The ribbon may define a length, a width, and a thickness, where the length is greater than the width, and where the width is greater than the thickness. The ribbon may be wound such that adjacent coils partially overlap one another in a radial direction, such as by at least 10%, at least 20%, or at least 30%, or such that adjacent coils do not overlap in a radial direction. Prior to installation, the energizing element 104 may define a diameter that may be greater than a diameter of the recess 110. That is, in an embodiment, the energizing element 104 may be oversized for the recess 110.

In an embodiment, the energizing element 104 may float relative to the jacket 102. More particularly, the energizing element 104 may move freely with respect to the recess 110. In another embodiment, the energizing element 104 may be coupled to the jacket 102, such as, for example, by an adhesive, mechanical deformation of one or both of the jacket 102 and energizing element 104, a threaded or non-threaded fastener, or by at least partially embedding the energizing element 104 within the jacket 102. In an embodiment, ends of the energizing element 104 may be encapsulated within the jacket 102 so as to prevent dislodgement of the energizing element 104 from the jacket 102. In embodiments utilizing adhesive, the adhesive layer (not illustrated) may be disposed between at least a portion of the energizing element 104 and the jacket 102. The adhesive layer may comprise a hot melt adhesive. Examples of adhesives that can be used include fluoropolymers, epoxy resins, polyimide resins, polyether/polyamide copolymers, ethylene vinyl acetates, ethylene tetrafluoroethylene (ETFE), ETFE copolymer, perfluoroalkoxy (PFA), or any combination thereof. Additionally, the adhesive can include at least one functional group selected from —C═O, —C—O—R, —COH, —COOH, —COOR, —CF$_2$═CF—OR, or any combination thereof, where R is a cyclic or linear organic group containing between 1 and 20 carbon atoms. Additionally, the adhesive can include a copolymer.

In an embodiment, the energizing element 104 can be formed from any suitable material recognized by those of ordinary skill in the art. By way of a non-limiting example, the energizing element 104 may include a polymer, a ceramic, a metal, an alloy, or a combination thereof. In a particular instance, the energizing element 104 can have a wrapped design. For example, an internal portion of the energizing element 104 may include a first material different from a material of an external portion of the energizing element 104. The external portion may wrap around all, or a portion, of the internal portion. In a particular embodiment, the energizing element 104 includes a metal. In a particular embodiment, the metal can be coated or surface treated to prevent corrosion or another undesirable effect from environmental exposure. Exemplary metals include steel, spring steel, stainless steel, bronze, copper, Monel, Inconel, Elgiloy, Hastelloy, and oil tempered chrome silicon or vanadium. In an embodiment, the energizing element 104 may include molybdenum, cobalt, iron, chromium, copper, manganese, titanium, zirconium, aluminum, Monel, oil tempered chrome silicon, vanadium, carbon, tungsten, alloys thereof, or any combination thereof. In a particular embodiment, the energizing element 104 includes stainless steel, such as 301 Stainless Steel, 302/304 Stainless Steel, 316 Stainless Steel, or 17-7 Stainless Steel. In a particular embodiment, the energizing element 104 can at least partially include, or even consist essentially of, a metal, such as a steel, or even more particularly energizing element steel. In another particular embodiment, the energizing element 104 can at least partially include, or even consist essentially of, for example, Elgiloy, Inconel, Hastelloy, or a combination thereof. In yet a further particular embodiment, the energizing element 104 can include cobalt, chromium, nickel, iron, molybdenum, manganese, or a combination thereof. In a particular embodiment, the energizing element 104 can include at least 10 wt % of cobalt, such as at least 20 wt % of cobalt, at least 25 wt % of cobalt, at least 30 wt % of cobalt, at least 35 wt % of cobalt, or even at least 40 wt % of cobalt.

In an embodiment, the energizing element 104 may include a polymer which may be selected from the group including a polyketone, a polyaramid, a polyphenylene sulfide, a polyethersulfone, a polyphenylene sulfone, a polyamideimide, ultra high molecular weight polyethylene, a fluoropolymer, a polybenzimidazole, a polyacetal, polybutylene terephthalate (PBT), polypropylene (PP), polycarbonate (PC), Acrylonitrile butadiene styrene (ABS), polyethylene terephthalate (PET), a polyimide (PI), polyetherimide, polyetheretherketone (PEEK), polyethylene (PE), a polysulfone, a polyamide (PA), polyphenylene oxide, polyphenylene sulfide (PPS), a polyurethane, a polyester, a liquid crystal polymer (LCP), or any combination thereof. In a particular embodiment, the energizing element 104 can at least partially include, or even consist essentially of, a fluoropolymer. Exemplary fluoropolymers include a polytetrafluoroethylene (PTFE), a polyether ether ketone (PEEK), a polyimide (PI), a polyamide-imide (PAI), a fluorinated ethylene propylene (FEP), a polyvinylidene fluoride (PVDF), a perfluoroalkoxy (PFA), a terpolymer of tetrafluoroethylene, a hexafluoropropylene and vinylidene fluoride (THV), a polychlorotrifluoroethylene (PCTFE), an ethylene tetrafluoroethylene copolymer (ETFE), an ethylene chlorotrifluoroethylene copolymer (ECTFE), or any combination thereof. Other fluoropolymers, polymers, and blends may be included in the composition of the jacket 100. In another particular embodiment, the jacket 100 can at least partially include, or even consist essentially of, a polyethylene (PE) such as an ultra-high-molecular-weight polyethylene (UHMWPE).

In an embodiment, the energizing element 104 may include a ceramic which may be selected from the group including a glass filler, silica, clay mica, kaolin, lithium soap, graphite, boron nitride, molybdenum disulfide, tungsten disulfide, polytetrafluoroethylene, carbon nitride, tungsten carbide, or diamond like carbon. The energizing element 104 may be an oxide or non-oxide ceramic.

In an embodiment, the energizing element 104 may have a diameter less than 150% the depth of the annular recess 106, such as less than 100% of the depth of the annular recess 106, or even less than 75% of the depth of the annular recess 106. In an embodiment, the diameter of the energizing element 104 can be no less than 10% of the depth of the annular recess 106.

As contemplated in at least one embodiment described herein, the energizing element 104 can include a length of material formed into a helical energizing element having a plurality of coils as described in further detail below. In an embodiment, the energizing element 104 can include at least 2 coils, such as at least 3 coils, at least 4 coils, at least 5 coils, at least 10 coils, at least 100 coils, at least 200 coils, at least 300 coils, at least 400 coils, at least 500 coils, or even at least 1000 coils. The length of material forming the energizing element 104 can have a polygonal or ellipsoidal cross section. For example, in an embodiment, the energizing element 104 can be formed from circular wire. In another embodiment, the energizing element 104 can be formed from a ribbon of material wound into a plurality of coils. The coils of the energizing element 104 can be adjacent or even partially overlap one another. In a particular instance the coils can be parallel to one another. In another instance, the coils can cant relative to each other. That is, the coils can be angularly offset and angled with respect to one another.

In an embodiment, the energizing element 104 may have a length, L$_S$, from a first axial end 104a to a second axial end 104b of the energizing element 104. The energizing element 104 may have a length, L$_S$, of at least 0.1 mm, at least 1 mm, at least 5 mm, at least 10 mm, at least 25 mm, at least 50 mm, at least 75 mm, at least 100 mm, at least 150 mm, at least 250 mm, at least 500 mm. The energizing element 104 may have a length, L$_S$, that may be no greater than 1500 mm or no greater than 1000 mm. In a number of embodiments, the energizing element 104 may have a length, L$_S$, of between 0.3 mm and 6 mm. It will be further appreciated that the energizing element 104 may have a length, L$_S$, that may be any value between any of the minimum and maximum values noted above. It can also be appreciated that the energizing element 104 may have a length, L$_S$, that may vary along its circumference.

In an embodiment, the energizing element 104 may have a width, W$_S$, from a first radial end 104c to a second radial end 104d of the energizing element 104. The energizing element 104 may have a width, W$_S$, of at least 0.1 mm, at least 1 mm, at least 5 mm, at least 10 mm, at least 25 mm, at least 50 mm, at least 75 mm, at least 100 mm, at least 150 mm, at least 250 mm, at least 500 mm. The energizing element 104 may have a width, $W_S$, that may be no greater than 1500 mm or no greater than 1000 mm. In a number of embodiments, the energizing element 104 may have a width, $W_S$, of between 0.3 mm and 6 mm. It will be further appreciated that the energizing element 104 may have a width, $W_S$, that may be any value between any of the minimum and maximum values noted above. It can also be appreciated that the energizing element 104 may have a width, $W_S$, that may vary along its circumference.

FIGS. 2A1-2K include views of exemplary energizing elements according to a number of embodiments. In a number of embodiments, as stated above, the energizing element 204 may include an energizing element body 205 including a filament 207. The filament 207 may be annular and oriented about a central axis 250. FIG. 2A1 includes an overhead view of an exemplary energizing element according to a number of embodiments. FIG. 2A2 includes a cross-sectional side view of an exemplary energizing element according to a number of embodiments. FIG. 2B1 includes an overhead view of an exemplary energizing element according to a number of embodiments. FIG. 2B2 includes a cross-sectional side view of an exemplary energizing element according to a number of embodiments. FIG. 2B3 includes a side perspective view of an exemplary energizing element according to a number of embodiments. As shown in FIGS. 2A1-2A2, the filament 207 may be coiled or wrapped so as to form a ribbon spring in the circumferential direction with a plurality of circumferential coils oriented about the central axis 250. As shown in FIGS. 2A1-2A2, the ribbon may have a varying width, forming a waved shape. Alternatively, as shown in FIGS. 2B1-2B3, the filament 207 may form a U-spring and have a plurality of tabs 210 oriented circumferentially about the central axis 250. Further, the tabs 210 may have a polygonal, arcuate, oval, elliptical, or circular cross-sectional shape or a combination thereof. The plurality of tabs may include at least one tab 210a oriented axially along an inner circumference of the energizing element 204. The plurality of tabs may include at least one tab 210b oriented axially along an outer circumference of the energizing element 204. As shown in FIGS. 2B1-2B2, the tabs may be circumferentially discrete. Alternatively, as shown in FIG. 2B3, the tab may form a continuous circumferential surface. In some embodiments, at least one of the tabs 210 may include an arcuate shape in the axial direction. In some embodiments, at least one of the tabs 210 may include an arcuate shape cross section oriented radially inward in the axial direction. In some embodiments, at least one of the tabs 210 may include an arcuate shape cross section oriented radially outward in the axial direction.

As shown in FIGS. 2A1-2B3, the energizing element body 205 may include an inner radius, IR, defined herein as the innermost point of the energizing element body 205 relative to the central axis 250. As shown in FIGS. 2A1-2B3, the energizing element body 205 may include an outer radius, OR, defined herein as the outermost point of the energizing element body 205 relative to the central axis 250. The energizing element body 205 may define an average radius, R, defined as the average between the inner radius and the outer radius (i.e. R=(IR+OR)/2). Further, the energizer element body 205 may define an adjusted width, W, which is the difference between the inner radius and the outer radius (i.e. W=OR−IR). In an embodiment, the energizing element 104 may have an adjusted width, W, of at least 0.1 mm, at least 1 mm, at least 5 mm, at least 10 mm, at least 25 mm, at least 50 mm, at least 75 mm, at least 100 mm, at least 150 mm, at least 250 mm, at least 500 mm. The energizing element 104 may have an adjusted width, W, that may be no greater than 1500 mm or no greater than 1000 mm. In a number of embodiments, the energizing element 104 may have an adjusted width, W, of between 0.3 mm and 6 mm. It will be further appreciated that energizing element 104 may have an adjusted width, W, that may be any value between any of the minimum and maximum values noted above. It can also be appreciated that energizing element 104 may an adjusted width, W, that may vary along its circumference.

Further, the energizer element body 205 may define an aspect ratio, AR, defined herein as the adjusted width divided by the average radius (i.e. AR=W/R). The aspect ratio of the energizing element body 205 may be at least 0.1, at least 0.2, at least 0.3, at least 0.4, at least 0.5, at least 0.6, at least 0.7, at least 0.8, at least 0.9, at least 0.95, or even at least 0.99. The aspect ratio of the energizing element body 205 may be no greater than 0.99, no greater than 0.95, no greater than 0.9, no greater than 0.8, no greater than 0.7, no greater than 0.6, no greater than 0.5, no greater than 0.4, no greater than 0.3, no greater than 0.2, or no greater than 0.1.

Further, the energizer element body 205 may define an inner radius perimeter, $P_{IR}$, along the inner radius (i.e. $P_{IR}=2\pi*(R-\frac{1}{2}*W)$). Further, the energizer element body 205 may define a maximum linear contact length, $L_{IR}$, along the inner radius with a neighboring component (i.e. the measured summation of the contact lengths between the inner coils along a circumference of the inner radius and a neighboring component as shown in FIG. 2A1). From these two variables, the maximum linear contact coverage with a neighboring component along the inner radius, $H_{IR}$, which may be calculated by dividing the maximum linear contact length along the inner radius by the inner radius perimeter (i.e. $H_{IR}=L_{IR}/P_{IR}$). The maximum linear contact coverage with a neighboring component along the inner radius, $H_{IR}$, may be at least 0.1, at least 0.2, at least 0.3, at least 0.4, at least 0.5, at least 0.6, at least 0.7, at least 0.8, at least 0.9, at least 0.95, or even at least 0.99. The maximum linear contact coverage with a neighboring component along the inner radius, $H_{IR}$, may be no greater than 0.99, no greater than 0.95, no greater than 0.9, no greater than 0.8, no greater than 0.7, no greater than 0.6, no greater than 0.5, no greater than 0.4, no greater than 0.3, no greater than 0.2, or no greater than 0.1. Further, the energizer element body 205 may define an outer radius perimeter, $P_{OR}$, along the outer radius (i.e. $P_{OR}=2\pi*(R+\frac{1}{2}*W)$). Further, the energizer element body 205 may define a maximum linear contact length, $L_{OR}$, along the outer radius with a neighboring component (i.e. the measured summation of the contact lengths between the inner coils along a circumference of the inner radius and a neighboring component as shown in FIG. 2A1). From these two variables, the maximum linear contact coverage with a neighboring component along the outer radius, $H_{IR}$, which may be calculated by dividing the maximum linear contact length along the outer radius by the inner outer perimeter (i.e. $H_{OR}=L_{OR}/P_{OR}$). The maximum linear contact coverage with a neighboring component along the outer radius, $H_{OR}$, may be at least 0.1, at least 0.2, at least 0.3, at least 0.4, at least 0.5, at least 0.6, at least 0.7, at least 0.8, at least 0.9, at least 0.95, or even at least 0.99. The maximum linear contact coverage with a neighboring component along the outer radius, $H_{OR}$, may be no greater than 0.99, no greater than 0.95, no greater than 0.9, no greater than 0.8, no greater than 0.7, no greater than 0.6, no greater than 0.5, no greater than 0.4, no greater than 0.3, no greater than 0.2, or no greater than 0.1.

FIG. 3 includes a graphical representation of linear contact coverage on the inner radius and the outer radius, $H_{IR}$, $H_{OR}$, as a function of spring aspect ratio, AR, for energizing elements according to a number of embodiments compared to prior art energizing elements. As shown in FIG. 3, higher linear contact coverage on the inner and outer radius is desired and embodiments herein have higher linear contact coverage at increasing aspect ratios. In other words, linear contact coverage on the inner radius and the outer radius, $H_{IR}$, $H_{OR}$ is above the lines for energizing elements according to embodiments herein and below the lines for prior art energizing elements. By non-limiting example, the energizing element of embodiments herein shown in FIGS. 2A1-2A2 can be made with a ribbon having varying width, at least partially allowing for the provided linear contact coverage, which is not achievable in prior art energizing elements. Further, by non-limiting example, the energizing element of embodiments herein shown in FIGS. 2B1-2B2 cannot be made such as when the element is flattened, the plurality of tabs would not overlap, at least partially allowing for the provided linear contact coverage, which is not achievable in prior art energizing elements that are made from flat metal sheets.

In a number of embodiments, when the aspect ratio, AR, is greater than 0.1, the energizing elements according to embodiments herein may achieve a maximum linear contact coverage with a neighboring component along the inner radius, $H_{IR}$, of greater than 0.8, such as 0.85, 0.9. 0.95, or even 0.99, which is not achievable by prior art energizing elements. In a number of embodiments, when the aspect ratio, AR, is greater than 0.1, the energizing elements according to embodiments herein may achieve a maximum linear contact coverage with a neighboring component along the outer radius, $H_{OR}$, of greater than 0.55, such as greater than 0.6, greater than 0.65, greater than 0.7, greater than 0.72, greater than 0.75, or even greater than 0.8, which is not achievable by prior art energizing elements.

In a number of embodiments, when the aspect ratio, AR, is greater than 0.2, the energizing elements according to embodiments herein may achieve a maximum linear contact coverage with a neighboring component along the inner radius, $H_{IR}$, of greater than 0.7, such as greater than 0.74, greater than 0.8, greater than 0.81, or even greater than 0.85, which is not achievable by prior art energizing elements. In a number of embodiments, when the aspect ratio, AR, is greater than 0.2, the energizing elements according to embodiments herein may achieve a maximum linear contact coverage with a neighboring component along the outer radius, $H_{OR}$, of greater than 0.3, such as greater than 0.38, greater than 0.4, greater than 0.45, greater than 0.5, greater than 0.6, or even greater than 0.7, which is not achievable by prior art energizing elements.

Referring back to FIGS. 2A1-2K, FIG. 2C includes an overhead perspective view of an exemplary energizing element according to a number of embodiments. In a number of embodiments, the filament 207 of the energizing element body 205 may include at least one and/or a plurality of oscillations 209 generally directed about the central axis 250. An oscillation 209 may be defined as the path a filament 207 travels from one transversal of a circumferentially oriented line 275 perpendicular and circumferential to the central axis 205 at a fixed point in the filament 207 to the neighboring transversal of the circumferentially oriented line 275 perpendicular to the central axis 250 at a neighboring point in the filament 207 of the energizing element 204. Further, in some embodiments, the filament 207 may be discrete and form a circumferential gap between a first circumferential end 212a and a second circumferential end 212b in the energizing element body 205. As shown in FIG. 2C, the energizing element 204 may have a U-shape in the circumferential direction. The embodiment of FIG. 2C may have an aspect ratio, AR, of any of the values listed above. The embodiment of FIG. 2C may have a maximum linear contact coverage with a neighboring component along the inner radius, $H_{IR}$, of any of the values listed above. The embodiment of FIG. 2C may have a maximum linear contact coverage with a neighboring component along the outer radius, $H_{OR}$, of any of the values listed above.

FIG. 2D includes an overhead perspective view of an exemplary energizing element according to a number of embodiments. Referring now to FIG. 2D, in a number of embodiments, the filament 207 of the energizing element body 205 may include at least one and/or a plurality of oscillations 209 generally directed about the central axis 250. An oscillation 209 may be defined as the path a filament 207 travels from one transversal of a circumferentially oriented line 275 perpendicular and circumferential to the central axis 205 at a fixed point in the filament 207 to the neighboring transversal of the circumferentially oriented line 275 perpendicular to the central axis 250 at a neighboring point in the filament 207 of the energizing element 204. Further, in some embodiments, the filament 207 may be discrete and form a circumferential gap between a first circumferential end 212a and a second circumferential end 212b in the energizing element body 205. As shown in FIG. 2D, the energizing element 204 may have a V-shape in the circumferential direction. The embodiment of FIG. 2C may have an aspect ratio, AR, of any of the values listed above. The embodiment of FIG. 2D may have a maximum linear contact coverage with a neighboring component along the inner radius, $H_{IR}$, of any of the values listed above. The embodiment of FIG. 2D may have a maximum linear contact coverage with a neighboring component along the outer radius, $H_{OR}$, of any of the values listed above.

Figure 2E:
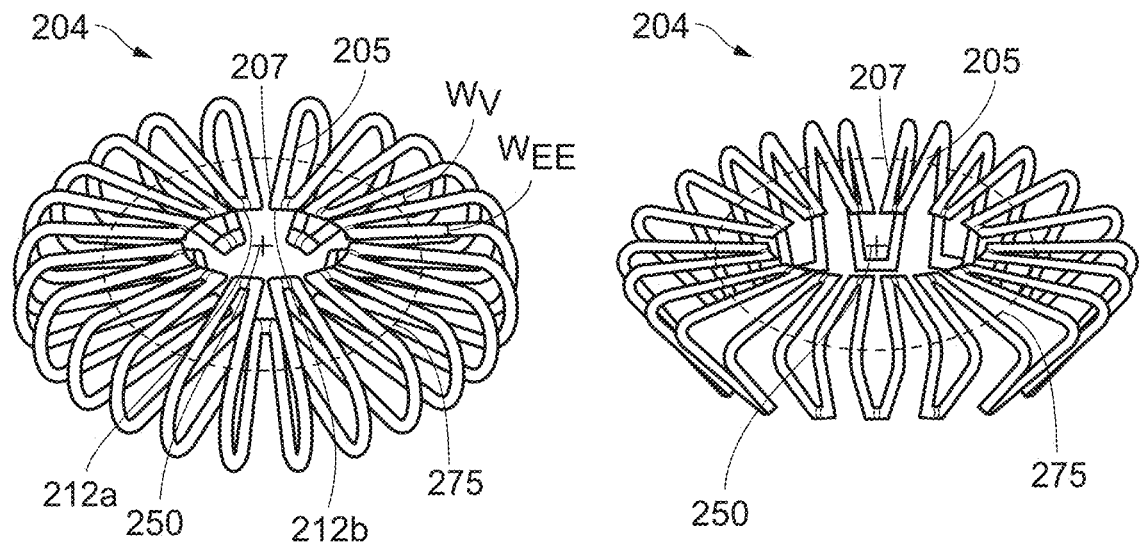
FIG. 2E includes an overhead perspective view of an energizing element according to a number of embodiments.
Figure 2E:
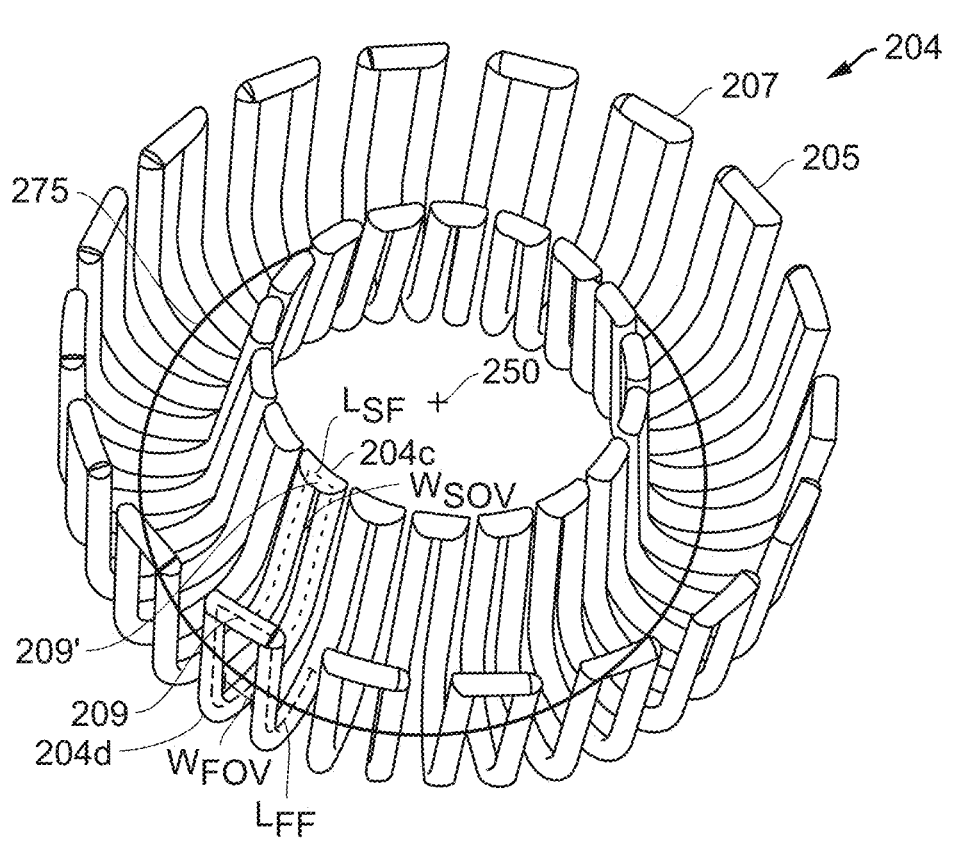
Figure 3:
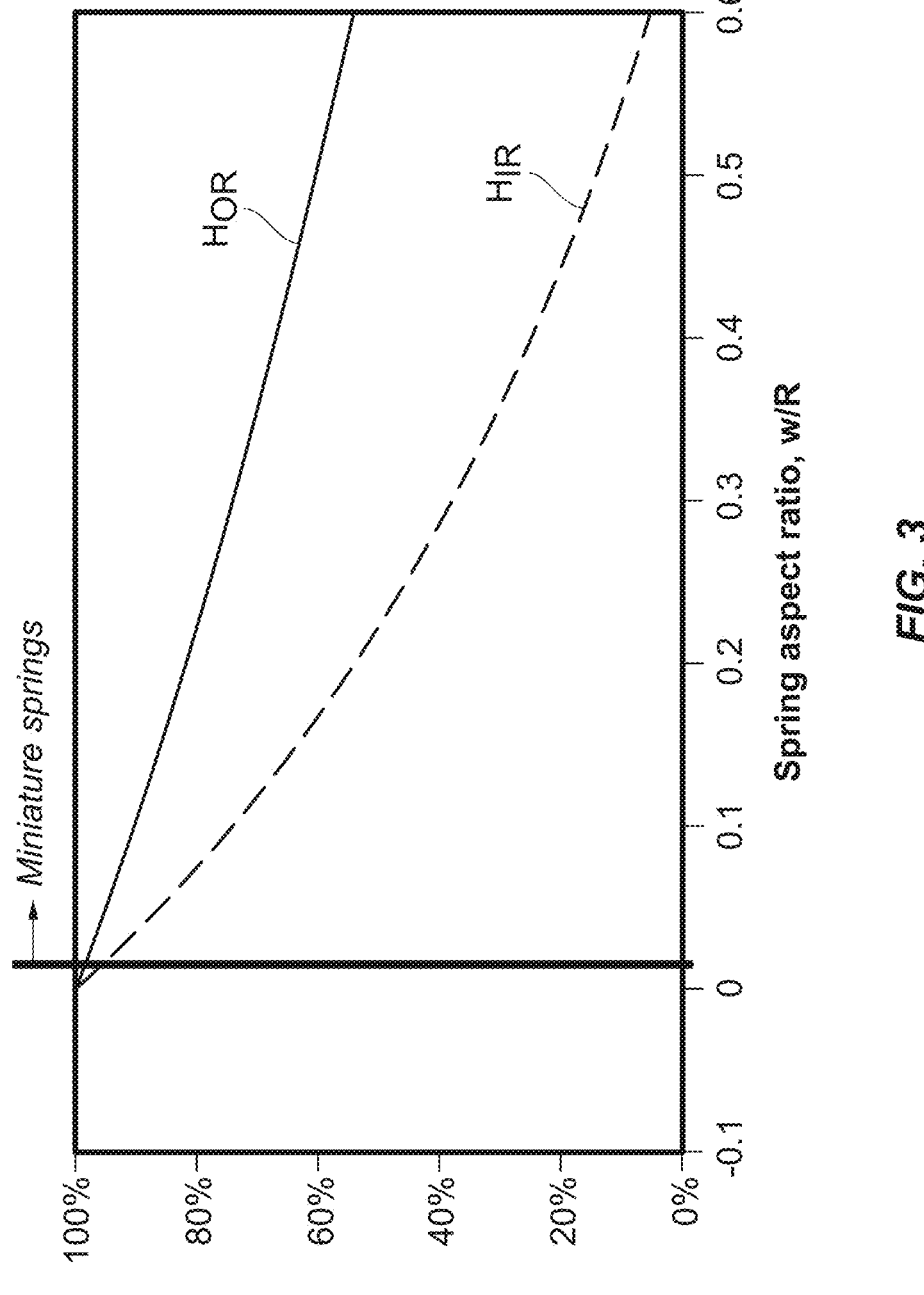

FIG. 2E includes an overhead perspective view of an energizing element according to a number of embodiments. As shown in FIG. 2E, the plurality of oscillations may include a first oscillation 209 generally directed down the central axis 250 at a second radial end 204d and a circumferentially neighboring second oscillation 209' generally directed down the central axis 250 at a first radial end 204c. The first oscillation 209 may be formed from the two points where the filament 207 meets the center point (e.g. where it intersects the circumferentially oriented line 275 perpendicular to the central axis 250). The second oscillation 209' may be formed from the two points where the filament 207 meets the center point (e.g. where it intersects the circumferentially oriented line 275 perpendicular to the central axis 250). The first oscillation 209 may include an internal circumferential void having a circumferential width, $W_{FOV}$, and the second oscillation 209' may include an internal circumferential void having a circumferential width, $W_{SOV}$, and $W_{FOV} \neq W_{SOV}$, such as $W_{FOV} \geq 2W_{SOV}$, such as $W_{FOV} \geq 5W_{SOV}$, or such as $W_{FOV} \geq 10W_{SOV}$. In a number of embodiments, the circumferential width of the internal circumferential void may change over the course of the oscillation path. The embodiment of FIG. 2E may have an aspect ratio, AR, of any of the values listed above. The embodiment of FIG. 2E may have a maximum linear contact coverage with a neighboring component along the inner radius, $H_{IR}$, of any of the values listed above. The embodiment of FIG.

2E may have a maximum linear contact coverage with a neighboring component along the outer radius, $H_{OR}$, of any of the values listed above.

FIG. 2F includes a side cross-sectional view of an energizing element according to a number of embodiments. As shown in FIG. 2F, the filament 207 of the energizing element body 205 may include a helical spring including a plurality of coils. In an embodiment, the filament 207 can include at least 2 coils, such as at least 3 coils, at least 4 coils, at least 5 coils, at least 10 coils, at least 100 coils, at least 200 coils, at least 300 coils, at least 400 coils, at least 500 coils, or even at least 1000 coils. In a number of embodiments, the coils may include axial gaps between them. Alternatively, as shown in FIG. 2F, the coils may include no axial gaps between them. The length of material forming the filament 207 can have a polygonal or ellipsoidal cross section. For example, in an embodiment, the filament 207 can be formed from circular wire. In another embodiment, the filament 207 can be formed from a ribbon of material wound into a plurality of coils. The coils of the filament 207 can be adjacent or even partially overlap one another. In a particular instance the coils can be parallel to one another. In another instance, the coils can cant relative to each other. That is, the coils can be angularly offset and angled with respect to one another. The embodiment of FIG. 2F may have an aspect ratio, AR, of any of the values listed above. The embodiment of FIG. 2F may have a maximum linear contact coverage with a neighboring component along the inner radius, $H_{IR}$, of any of the values listed above. The embodiment of FIG. 2F may have a maximum linear contact coverage with a neighboring component along the outer radius, $H_{OR}$, of any of the values listed above.

FIG. 2G includes a cross-sectional view of an energizing element according to a number of embodiments. As shown in FIG. 2G, the filament 207 of the energizing element body 205 may include a helical spring including a plurality of coils. In an embodiment, the filament 207 can include at least 2 coils, such as at least 3 coils, at least 4 coils, at least 5 coils, at least 10 coils, at least 100 coils, at least 200 coils, at least 300 coils, at least 400 coils, at least 500 coils, or even at least 1000 coils. In a number of embodiments, as shown in FIG. 2G, the coils may include axial gaps between them. Alternatively, the coils may include no axial gaps between them. The length of material forming the filament 207 can have a polygonal or ellipsoidal cross section. For example, in an embodiment, the filament 207 can be formed from circular wire. In another embodiment, the filament 207 can be formed from a ribbon of material wound into a plurality of coils. The coils of the filament 207 can be adjacent or even partially overlap one another. In a particular instance, alternatively to the energizing element of FIG. 2F, the coils can be non-parallel to one another and form an axial taper outward or inward. As shown in the energizing element of exemplary FIG. 2G, the axial taper may be inward. In another instance, the coils can cant relative to each other. That is, the coils can be angularly offset and angled with respect to one another. The embodiment of FIG. 2G may have an aspect ratio, AR, of any of the values listed above. The embodiment of FIG. 2G may have a maximum linear contact coverage with a neighboring component along the inner radius, $H_{IR}$, of any of the values listed above. The embodiment of FIG. 2G may have a maximum linear contact coverage with a neighboring component along the outer radius, $H_{OR}$, of any of the values listed above.

Figure 2H:
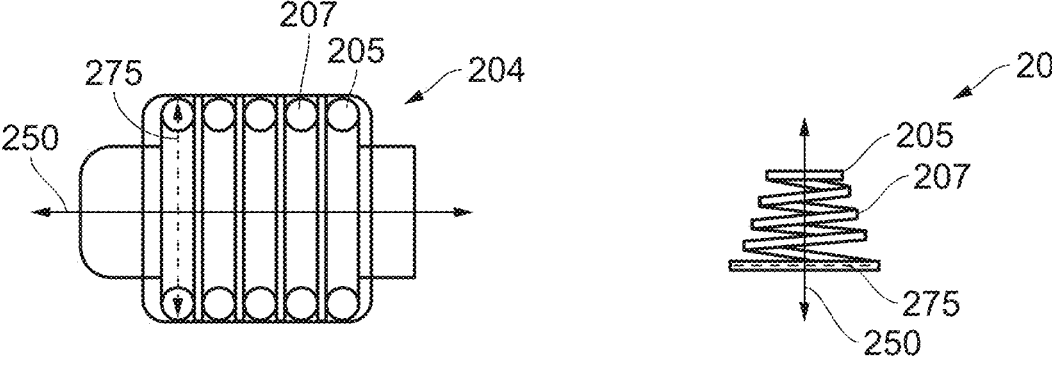
FIG. 2H includes a perspective view of an energizing element according to a number of embodiments.
Figure 2H:
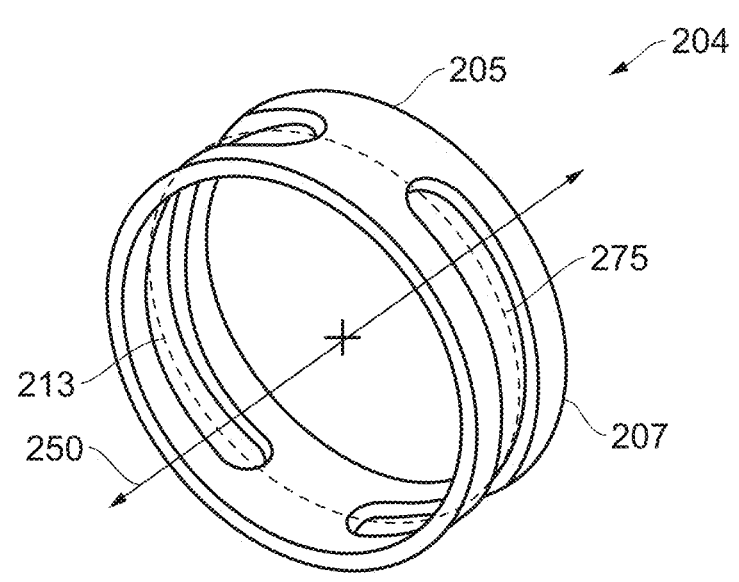

FIG. 2H includes a perspective view of an energizing element according to a number of embodiments. As shown in FIG. 2H, the filament 207 of the energizing element body

205 may include a helical spring including a plurality of coils. In an embodiment, the filament 207 can include at least 2 coils, such as at least 3 coils, at least 4 coils, at least 5 coils, at least 10 coils, at least 100 coils, at least 200 coils, at least 300 coils, at least 400 coils, at least 500 coils, or even at least 1000 coils. In a number of embodiments, the coils may include axial gaps between them. Alternatively, the coils may include no axial gaps between them. The length of material forming the filament 207 can have a polygonal or ellipsoidal cross section. For example, in an embodiment, the filament 207 can be formed from circular wire. In another embodiment, the filament 207 can be formed from a ribbon of material wound into a plurality of coils. The coils of the filament 207 can be adjacent or even partially overlap one another. The filament 207 may be continuous or non-continuous (i.e. have a circumferential gap). In another instance, the coils can cant relative to each other. That is, the coils can be angularly offset and angled with respect to one another. As shown in the energizing element of exemplary FIG. 2H, the coils may have circumferential cutouts or gap 213 within the filament 207 of an individual coil. The circumferential cutout or gap 213 may have a polygonal, ellipsoidal, or circular cross-section. The embodiment of FIG. 2H may have an aspect ratio, AR, of any of the values listed above. The embodiment of FIG. 2H may have a maximum linear contact coverage with a neighboring component along the inner radius, $H_{IR}$, of any of the values listed above. The embodiment of FIG. 2H may have a maximum linear contact coverage with a neighboring component along the outer radius, $H_{OR}$, of any of the values listed above.

FIG. 2I includes a top view of an energizing element according to a number of embodiments. As shown in FIG. 2I, the filament 207 of the energizing element body 205 may include a helical spring including a plurality of coils. In an embodiment, the filament 207 can include at least 2 coils, such as at least 3 coils, at least 4 coils, at least 5 coils, at least 10 coils, at least 100 coils, at least 200 coils, at least 300 coils, at least 400 coils, at least 500 coils, or even at least 1000 coils. In a number of embodiments, the coils may include axial gaps between them. Alternatively, as shown in FIG. 2I, the coils may include no axial gaps between them. The length of material forming the filament 207 can have a polygonal or ellipsoidal cross section. For example, in an embodiment, the filament 207 can be formed from circular wire. In another embodiment, the filament 207 can be formed from a ribbon of material wound into a plurality of coils. As shown in FIG. 2I, the coils of the filament 207 can be adjacent or even partially overlap one another. Further, as shown in FIG. 2I, the coils can cant relative to each other. That is, the coils can be angularly offset and angled with respect to one another. The embodiment of FIG. 2I may have an aspect ratio, AR, of any of the values listed above. The embodiment of FIG. 2I may have a maximum linear contact coverage with a neighboring component along the inner radius, $H_{IR}$, of any of the values listed above. The embodiment of FIG. 2I may have a maximum linear contact coverage with a neighboring component along the outer radius, $H_{OR}$, of any of the values listed above.

FIG. 2J includes a top view of an energizing element according to a number of embodiments. As shown in FIG. 2J, the filament 207 of the energizing element body 205 may include a helical spring including a plurality of coils. In an embodiment, the filament 207 can include at least 2 coils, such as at least 3 coils, at least 4 coils, at least 5 coils, at least 10 coils, at least 100 coils, at least 200 coils, at least 300 coils, at least 400 coils, at least 500 coils, or even at least 1000 coils. In a number of embodiments, as shown in FIG.

2J, the coils may include axial gaps between them. Alternatively, the coils may include no axial gaps between them. The length of material forming the filament 207 can have a polygonal or ellipsoidal cross section. For example, in an embodiment, the filament 207 can be formed from circular wire. In another embodiment, the filament 207 can be formed from a ribbon of material wound into a plurality of coils. As shown in FIG. 2J, the coils of the filament 207 can be adjacent or even partially overlap one another. Further, as shown in FIG. 2J, the coils can cant relative to each other. That is, the coils can be angularly offset and angled with respect to one another. Further, as shown in FIG. 2J, the filament 207 may have a non-uniform thickness, resulting in uneven coil shape. The embodiment of FIG. 2J may have an aspect ratio, AR, of any of the values listed above. The embodiment of FIG. 2J may have a maximum linear contact coverage with a neighboring component along the inner radius, $H_{IR}$, of any of the values listed above. The embodiment of FIG. 2J may have a maximum linear contact coverage with a neighboring component along the outer radius, $H_{OR}$, of any of the values listed above.

Figure 2K:
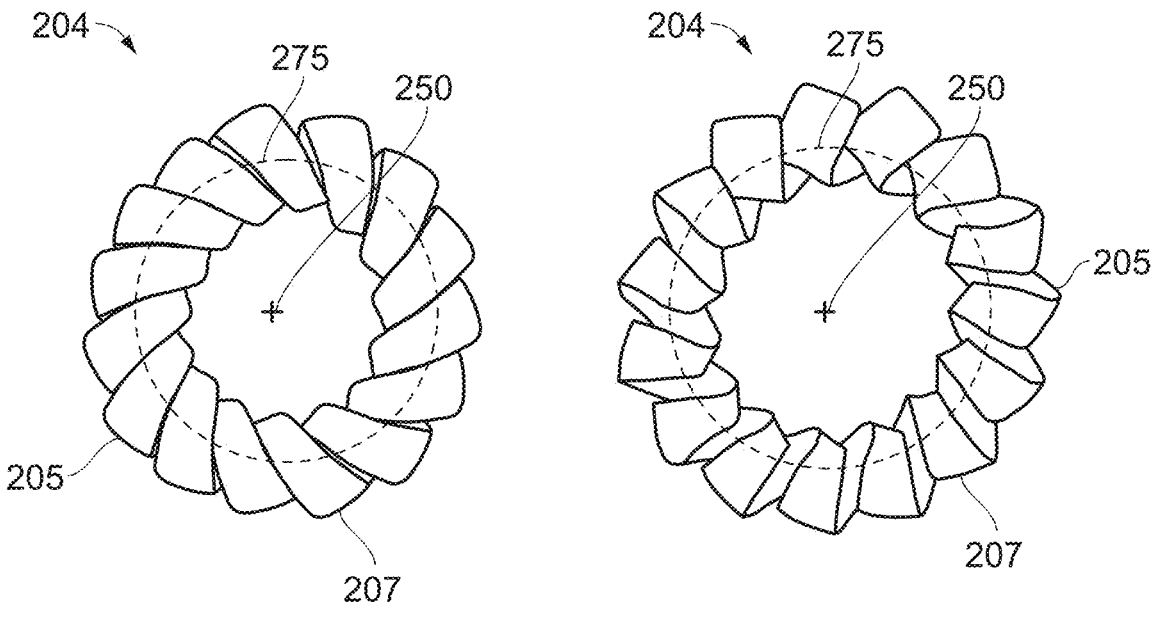
FIG. 2K includes a top view of an energizing element according to a number of embodiments.
Figure 2K:
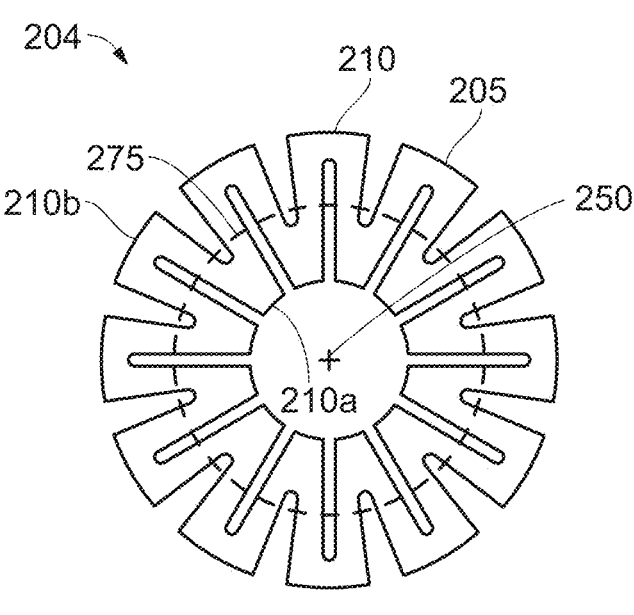

FIG. 2K includes a top view of an energizing element according to a number of embodiments. As shown in FIG. 2K, the filament 207 of the energizing element body 205 may form a flat pre-shape for a U-spring (similar to FIGS. 2B1-2B3) and have a plurality of tabs 210 oriented circumferentially about the central axis 250. Further, the tabs 210 may have a polygonal, arcuate, oval, elliptical, or circular cross-sectional shape or a combination thereof. The plurality of tabs may include at least one tab 210a oriented axially along an inner circumference of the energizing element 204. The plurality of tabs may include at least one tab 210b oriented axially along an outer circumference of the energizing element 204. As shown in FIG. 2K, the tabs 210 may be circumferentially discrete. The tabs 210 may be formed in a zig-zag pattern as shown in FIG. 2K. In a number of embodiments, the energizing element as shown in FIG. 2K may be a flattened version of the energizing element shown in FIGS. 2B1-2B2. The embodiment of FIG. 2K may have an aspect ratio, AR, of any of the values listed above. The embodiment of FIG. 2K may have a maximum linear contact coverage with a neighboring component along the inner radius, $H_{IR}$, of any of the values listed above. The embodiment of FIG. 2K may have a maximum linear contact coverage with a neighboring component along the outer radius, $H_{OR}$, of any of the values listed above.

In an embodiment herein, a method of forming an energizing element is shown. In a number of embodiments, the method may include providing a filament. Further, in a number of embodiments, the method may include manipulating the filament to form an energizing element body oriented about a central axis, the energizing element body defining an inner radius, IR, and an outer radius, OR, where the difference between the outer radius and the inner radius defines an adjusted width, W, of the energizing element body, where the inner radius and the outer radius determine an average radius, R, of the energizing element body about the central axis, where the energizing element body defines an aspect ratio, W/R, where W/R>0.1, where the energizing element body has a maximum linear contact length on the inner radius, $L_{IR}$, where the energizing element body has a perimeter on the inner radius, $P_{IR}$, and $L_{IR}/P_{IR}$>0.80, where the energizing element body has a maximum linear contact length on the outer radius, $L_{OR}$, where the energizing element body has a perimeter on the outer radius, $P_{OR}$, and $L_{OR}/P_{OR}$>0.55, and where the adjusted width is less than 5 mm.

In an embodiment herein, a method of forming an energizing element is shown. In a number of embodiments, the method may include providing a filament. Further, in a number of embodiments, the method may include manipulating the filament to form an energizing element body oriented about a central axis, the energizing element body defining an inner radius, IR, and an outer radius, OR, where the difference between the outer radius and the inner radius defines an adjusted width, W, of the energizing element body, where the inner radius and the outer radius determine an average radius, R, of the energizing element body about the central axis, where the energizing element body defines an aspect ratio, W/R, where W/R>0.2, where the energizing element body has a maximum linear contact length on the inner radius, $L_{IR}$, where the energizing element body has a perimeter on the inner radius, $P_{IR}$, and $L_{IR}/P_{IR}$>0.74, where the energizing element body has a maximum linear contact length on the outer radius, $L_{OR}$, where the energizing element body has a perimeter on the outer radius, $P_{OR}$, and $L_{OR}/P_{OR}$>0.38, and where the adjusted width is less than 5 mm.

In an embodiment herein, a method of forming an energizing element is shown. In a number of embodiments, the method may include providing an additive manufacturing process. Further, in a number of embodiments, the method may include manipulating a powder or an extruded or a heat-curable or photo-curable resin or liquid to form an energizing element body oriented about a central axis, the energizing element body defining an inner radius, IR, and an outer radius, OR, where the difference between the outer radius and the inner radius defines an adjusted width, W, of the energizing element body, where the inner radius and the outer radius determine an average radius, R, of the energizing element body about the central axis, where the energizing element body defines an aspect ratio, W/R, where W/R>0.1, where the energizing element body has a maximum linear contact length on the inner radius, $L_{IR}$, where the energizing element body has a perimeter on the inner radius, $P_{IR}$, and $L_{IR}/P_{IR}$>0.80, where the energizing element body has a maximum linear contact length on the outer radius, $L_{OR}$, where the energizing element body has a perimeter on the outer radius, $P_{OR}$, and $L_{OR}/P_{OR}$>0.55, and where the adjusted width is less than 5 mm.

In an embodiment herein, a method of forming an energizing element is shown. In a number of embodiments, the method may include providing an additive manufacturing process. Further, in a number of embodiments, the method may include manipulating a powder or an extruded or a heat-curable or photo-curable resin or liquid to form an energizing element body oriented about a central axis, the energizing element body defining an inner radius, IR, and an outer radius, OR, where the difference between the outer radius and the inner radius defines an adjusted width, W, of the energizing element body, where the inner radius and the outer radius determine an average radius, R, of the energizing element body about the central axis, where the energizing element body defines an aspect ratio, W/R, where W/R>0.2, where the energizing element body has a maximum linear contact length on the inner radius, $L_{IR}$, where the energizing element body has a perimeter on the inner radius, $P_{IR}$, and $L_{IR}/P_{IR}$>0.74, where the energizing element body has a maximum linear contact length on the outer radius, $L_{OR}$, where the energizing element body has a perimeter on the outer radius, $P_{OR}$, and $L_{OR}/P_{OR}$>0.38, and where the adjusted width is less than 5 mm.

In an embodiment herein, a method of forming an energizing element is shown. In a number of embodiments, the method may include providing an injection molding method. Further, in a number of embodiments, the method may include manipulating a melt processable polymer or a metal powder loaded resin, or a ceramic powder loaded resin, or a molten metal to form an energizing element body oriented about a central axis, the energizing element body defining an inner radius, IR, and an outer radius, OR, where the difference between the outer radius and the inner radius defines an adjusted width, W, of the energizing element body, where the inner radius and the outer radius determine an average radius, R, of the energizing element body about the central axis, where the energizing element body defines an aspect ratio, W/R, where W/R>0.1, where the energizing element body has a maximum linear contact length on the inner radius, $L_{IR}$, where the energizing element body has a perimeter on the inner radius, $P_{IR}$, and $L_{IR}/P_{IR}$>0.80, where the energizing element body has a maximum linear contact length on the outer radius, $L_{OR}$, where the energizing element body has a perimeter on the outer radius, $P_{OR}$, and $L_{OR}/P_{OR}$>0.55, and where the adjusted width is less than 5 mm.

In an embodiment herein, a method of forming an energizing element is shown. In a number of embodiments, the method may include providing an injection molding method. Further, in a number of embodiments, the method may include manipulating a melt processable polymer or a metal powder loaded resin, or a ceramic powder loaded resin, or a molten metal to form an energizing element body oriented about a central axis, the energizing element body defining an inner radius, IR, and an outer radius, OR, where the difference between the outer radius and the inner radius defines an adjusted width, W, of the energizing element body, where the inner radius and the outer radius determine an average radius, R, of the energizing element body about the central axis, where the energizing element body defines an aspect ratio, W/R, where W/R>0.2, where the energizing element body has a maximum linear contact length on the inner radius, $L_{IR}$, where the energizing element body has a perimeter on the inner radius, $P_{IR}$, and $L_{IR}/P_{IR}$>0.74, where the energizing element body has a maximum linear contact length on the outer radius, $L_{OR}$, where the energizing element body has a perimeter on the outer radius, $P_{OR}$, and $L_{OR}/P_{OR}$>0.38, and where the adjusted width is less than 5 mm.

In an embodiment herein, a method of forming an energizing element is shown. In a number of embodiments, the method may include providing a bulk metallic or ceramic or polymer shape; or a welded metallic 3D shape. Further, in a number of embodiments, the method may include machining, lathing or cutting to form an energizing element body oriented about a central axis, the energizing element body defining an inner radius, IR, and an outer radius, OR, where the difference between the outer radius and the inner radius defines an adjusted width, W, of the energizing element body, where the inner radius and the outer radius determine an average radius, R, of the energizing element body about the central axis, where the energizing element body defines an aspect ratio, W/R, where W/R>0.1, where the energizing element body has a maximum linear contact length on the inner radius, $L_{IR}$, where the energizing element body has a perimeter on the inner radius, $P_{IR}$, and $L_{IR}/P_{IR}$>0.80, where the energizing element body has a maximum linear contact length on the outer radius, $L_{OR}$, where the energizing element body has a perimeter on the outer radius, $P_{OR}$, and $L_{OR}/P_{OR}$>0.55, and where the adjusted width is less than 5 mm.

In an embodiment herein, a method of forming an energizing element is shown. In a number of embodiments, the method may include providing a bulk metallic or ceramic or polymer shape or a welded metallic 3D shape. Further, in a number of embodiments, the method may include machining or lathing or cutting to form an energizing element body oriented about a central axis, the energizing element body defining an inner radius, IR, and an outer radius, OR, where the difference between the outer radius and the inner radius defines an adjusted width, W, of the energizing element body, where the inner radius and the outer radius determine an average radius, R, of the energizing element body about the central axis, where the energizing element body defines an aspect ratio, W/R, where W/R>0.2, where the energizing element body has a maximum linear contact length on the inner radius, $L_{IR}$, where the energizing element body has a perimeter on the inner radius, $P_{IR}$, and $L_{IR}/P_{IR}$>0.74, where the energizing element body has a maximum linear contact length on the outer radius, $L_{OR}$, where the energizing element body has a perimeter on the outer radius, $P_{OR}$, and $L_{OR}/P_{OR}$>0.38, and where the adjusted width is less than 5 mm.

In an embodiment herein, a method of forming an energizing element is shown. In a number of embodiments, the method may include providing a flat non-straight metallic ribbon. Further, in a number of embodiments, the method may include manipulating the ribbon to form an energizing element body oriented about a central axis, the energizing element body defining an inner radius, IR, and an outer radius, OR, where the difference between the outer radius and the inner radius defines an adjusted width, W, of the energizing element body, where the inner radius and the outer radius determine an average radius, R, of the energizing element body about the central axis, where the energizing element body defines an aspect ratio, W/R, where W/R>0.1, where the energizing element body has a maximum linear contact length on the inner radius, $L_{IR}$, where the energizing element body has a perimeter on the inner radius, $P_{IR}$, and $L_{IR}/P_{IR}$>0.80, where the energizing element body has a maximum linear contact length on the outer radius, $L_{OR}$, where the energizing element body has a perimeter on the outer radius, $P_{OR}$, and $L_{OR}/P_{OR}$>0.55, and where the adjusted width is less than 5 mm.

In an embodiment herein, a method of forming an energizing element is shown. In a number of embodiments, the method may include providing a flat non-straight metallic ribbon. Further, in a number of embodiments, the method may include manipulating the ribbon to form an energizing element body oriented about a central axis, the energizing element body defining an inner radius, IR, and an outer radius, OR, where the difference between the outer radius and the inner radius defines an adjusted width, W, of the energizing element body, where the inner radius and the outer radius determine an average radius, R, of the energizing element body about the central axis, where the energizing element body defines an aspect ratio, W/R, where W/R>0.2, where the energizing element body has a maximum linear contact length on the inner radius, $L_{IR}$, where the energizing element body has a perimeter on the inner radius, $P_{IR}$, and $L_{IR}/P_{IR}$>0.74, where the energizing element body has a maximum linear contact length on the outer radius, $L_{OR}$, where the energizing element body has a perimeter on the outer radius, $P_{OR}$, and $L_{OR}/P_{OR}$>0.38, and where the adjusted width is less than 5 mm.

In an embodiment herein, a method of forming an energizing element is shown. In a number of embodiments, the method may include providing any article from one of the forming methods herein. Further, in a number of embodiments, the method may include coating to form an energizing element body oriented about a central axis, the energizing element body defining an inner radius, IR, and an outer radius, OR, where the difference between the outer radius and the inner radius defines an adjusted width, W, of the energizing element body, where the inner radius and the outer radius determine an average radius, R, of the energizing element body about the central axis, where the energizing element body defines an aspect ratio, W/R, where W/R>0.1, where the energizing element body has a maximum linear contact length on the inner radius, $L_{IR}$, where the energizing element body has a perimeter on the inner radius, $P_{IR}$, and $L_{IR}/P_{IR}>0.80$, where the energizing element body has a maximum linear contact length on the outer radius, $L_{OR}$, where the energizing element body has a perimeter on the outer radius, $P_{OR}$, and $L_{OR}/P_{OR}>0.55$, and where the adjusted width is less than 5 mm.

In an embodiment herein, a method of forming an energizing element is shown. In a number of embodiments, the method may include providing any article from one of the forming methods herein. Further, in a number of embodiments, the method may include coating to form an energizing element body oriented about a central axis, the energizing element body defining an inner radius, IR, and an outer radius, OR, where the difference between the outer radius and the inner radius defines an adjusted width, W, of the energizing element body, where the inner radius and the outer radius determine an average radius, R, of the energizing element body about the central axis, where the energizing element body defines an aspect ratio, W/R, where W/R>0.2, where the energizing element body has a maximum linear contact length on the inner radius, $L_{IR}$, where the energizing element body has a perimeter on the inner radius, $P_{IR}$, and $L_{IR}/P_{IR}>0.74$, where the energizing element body has a maximum linear contact length on the outer radius, $L_{OR}$, where the energizing element body has a perimeter on the outer radius, $P_{OR}$, and $L_{OR}/P_{OR}>0.38$, and where the adjusted width is less than 5 mm.

The manipulation of the filament, manipulation of the ribbon, or the machining, lathing or cutting of a bulk metallic or ceramic or polymer shape; or a welded metallic 3D shape may include at least one of a chamfering, turning, reaming, forging, extruding, molding, micromolding, micromachining, sintering, rolling, or casting, injection molding, metalworking, flattening, or 3-D printing (including binderjetting, stereolithography, filament disposition method, laser melting, laser sintering, electron beam melting). The energizing element mentioned herein (or any components thereof) of embodiments herein can utilize one or more combinations of features, including particular materials, thicknesses of the material (including irregular thicknesses of the filament in cross-section (e.g. flattening)), dimensions of the component, and certain mechanical properties (e.g., stiffness), and chemical inertness that are desired in the industry. It is also contemplated herein that gaps between neighboring coils in either the axial or radial direction could be bridged to form a monolithic shape through use of the manufacturing and manipulation methods stated above. It is also contemplated herein that the shape of the wire through use of the manufacturing and manipulation methods stated above.

As stated above, a coating may be applied to the filament to form an energizing element body. In a particular embodiment, the coating may take the form of a support member that supports the interior of the coils of the filament. The coating of the filament, ribbon, bulk metallic or ceramic or polymer shape, or welded metallic 3D shape may be done by physical vapor disposition, chemical vapor disposition, spraying, electrochemical plating, roll-to-roll coating processes, spin coating, or dip coating, or may be done by any techniques known in the industry. The coating may include a composition. In an embodiment, the coating may include a composition including a parylene. In an embodiment, the coating may include a composition including a parylene dimer. In an embodiment, the coating may include a composition including a polymer. In an embodiment, the coating may include a composition including a ceramic. In an embodiment, the coating may include a composition including a metal. In an embodiment, the coating may include a composition including a diamond-like carbon.

The coating can at least partially include a parylene. The coating can at least partially include a parylene dimer. In an embodiment, the coating may include a composition including a chlorinated parylene dimer, a parylene dimer including a para-xylylene, or a fluorinated parylene dimer. In an embodiment the chlorinated parylene dimer may be a parylene dimer modified only by the substitution of a chlorine atom for one of the aromatic hydrogens. In an embodiment the chlorinated parylene dimer may be a parylene dimer modified only by the substitution of chlorine atoms for two of the aromatic hydrogens. In an embodiment the parylene dimer including a para-xylylene may be a parylene dimer. In an embodiment the fluorinated parylene dimer may be a parylene dimer modified only by the substitution of an alpha hydrogen atom of the para-xylylene dimer for a fluorine atom.

The coating can at least partially include a polymer. The polymer may be selected from the group including a polyketone, a polyaramid, a polyphenylene sulfide, a polyethersulfone, a polyphenylene sulfone, a polyamideimide, ultra high molecular weight polyethylene, a fluoropolymer, a polybenzimidazole, a polyacetal, polybutylene terephthalate (PBT), polypropylene (PP), polycarbonate (PC), Acrylonitrile butadiene styrene (ABS), polyethylene terephthalate (PET), a polyimide (PI), polyetherimide, polyetheretherketone (PEEK), polyethylene (PE), a polysulfone, a polyamide (PA), polyphenylene oxide, polyphenylene sulfide (PPS), a polyurethane, a polyester, a liquid crystal polymer (LCP), or any combination thereof.

The polymer may be a thermoplastic or thermosetting polymer. In an embodiment, the jacket 102 may include, or even consist essentially of, a fluoropolymer. Exemplary fluoropolymers include a polytetrafluoroethylene (PTFE), a polyether ether ketone (PEEK), a polyimide (PI), a polyamide-imide (PAI), a fluorinated ethylene propylene (FEP), a polyvinylidene fluoride (PVDF), a perfluoroalkoxy (PFA), a terpolymer of tetrafluoroethylene, a hexafluoropropylene and vinylidene fluoride (THV), a polychlorotrifluoroethylene (PCTFE), an ethylene tetrafluoroethylene copolymer (ETFE), an ethylene chlorotrifluoroethylene copolymer (ECTFE), or any combination thereof. Other fluoropolymers, polymers, and blends may be included. In another particular embodiment, the coating can at least partially include, or even consist essentially of, a polyethylene (PE) such as an ultra-high-molecular-weight polyethylene (UHMWPE). In another particular embodiment, the coating may include a thermoplastic elastomeric hydrocarbon block copolymer, a polyether-ester block co-polymer, a thermoplastic polyamide elastomer, a thermoplastic polyurethane elastomer, a thermoplastic polyolefin elastomer, a thermoplastic vulcanizate, an olefin-based co-polymer, an olefin-based ter-polymer, a polyolefin plastomer, or combinations thereof. In an embodiment, the coating may include a styrene-based block copolymer such as styrene-butadiene, styrene-isoprene, blends or mixtures thereof, and the like. Exemplary styrenic thermoplastic elastomers include tri-block styrenic block copolymers (SBC) such as styrene-butadiene-styrene (SBS), styrene-isoprene-styrene (SIS), styrene-ethylene butylene-styrene (SEBS), styrene-ethylene propylene-styrene (SEPS), styrene-ethylene-ethylene-buta-diene-styrene (SEEBS), styrene-ethylene-ethylene-propyl-ene-styrene (SEEPS), styrene-isoprene-butadiene-styrene (SIBS), or combinations thereof. Commercial examples include some grades of Kraton™ and Hybrar™ resins. In an embodiment, the coating may include an elastomer includ-ing at least one of Acrylonitrile-Butadiene (NBR) Carboxy-lated Nitrile (XNBR) Ethylene Acrylate (AEM, Vamac®), Ethylene Propylene Rubber (EPR, EPDM), Butyl Rubber (IIR), Chloroprene Rubber (CR), Fluorocarbon (FKM, FPM), Fluorosilicone (FVMQ), Hydrogenated Nitrile (HNBR), Perfluoroelastomer (FFKM), Polyacrylate (ACM), Polyurethane (AU, EU), Silicone Rubber (Q, MQ, VMQ, PVMQ), Tetrafluoroethylene-Propylene (AFLAS®) (FEPM).

In an embodiment, the coating can include a ceramic including at least one of glass, silica, clay mica, kaolin, alumina, silica, titanium dioxide, calcium fluoride, boron nitride, mica, wollastonite, silicon carbide, silicon nitride, zirconia, carbon black, pigments, or any combination thereof.

In an embodiment, the coating can include a metal. According to certain embodiments, the metal may include iron, copper, titanium, tin, aluminum, alloys thereof, or may be another type of metal. In an embodiment, the coating can include a metal (such as aluminum, zinc, copper, magne-sium, tin, platinum, titanium, tungsten, iron, bronze, steel, spring steel, stainless steel), a metal alloy (including the metals listed), an anodized metal (including the metals listed) or any combination thereof.

Figure 4A:
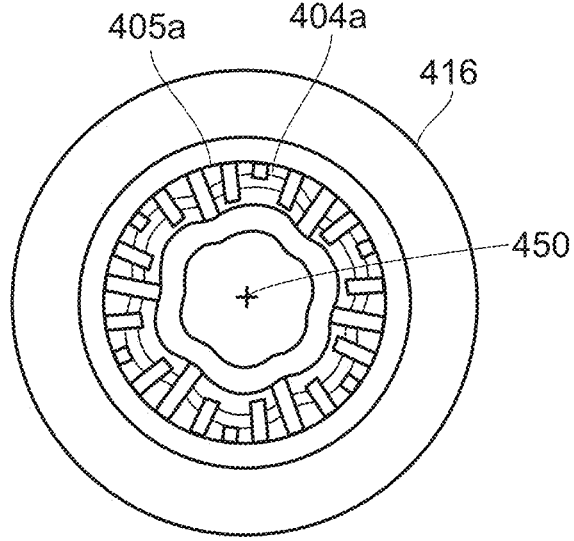
FIG. 4A includes a photo of a prior art energizing element contacting a neighboring component along its inner and outer circumference.
Figure 4B:
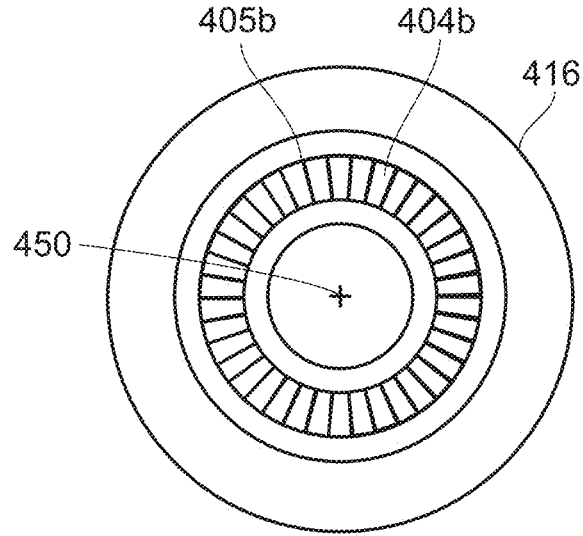
FIG. 4B includes a photo of an energizing element according to a number of embodiments contacting a neighboring component along its inner and outer circumference.

FIG. 4A includes a photo of a prior art energizing element contacting a neighboring component along its inner and outer circumference. FIG. 4B includes a photo of an ener-gizing element according to a number of embodiments contacting a neighboring component along its inner and outer circumference. As shown in FIG. 4A, the prior art energizing element 404a may have a body 405a that contacts the neighboring component 416 when viewed cross-section-ally down a central axis 450 at uneven points with non-substantially continuous contact along its inner or outer circumference. However, desirably and optimally, as shown in FIG. 4B, energizing elements 404b according to a number of embodiments herein made with methods described above may have a body 405b that contacts the neighboring com-ponent 416 when viewed cross-sectionally down a central axis 450 with a substantially continuous contact along at least one of its inner or outer circumference.

Energizing elements described according to embodiments herein may allow for improved design customization and flexibility for a majority of applications including, but not limited to, seals applications. Further, energizing elements described according to embodiments herein may allow for improved load range performance for a majority of appli-cations including, but not limited to, seals applications. Further, energizing elements described according to embodi-ments herein may allow for reduction of gaps in the ener-gizing element for a majority of applications including, but not limited to, seals applications. Further, energizing ele-ments described according to embodiments herein may provide improved linear contact at smaller sizes than exist-ing prior art energizing elements, allowing for improved leakage performance in difficult sizing environments. Seals including energizing elements described according to embodiments herein may allow for the components of the seal to have a longer lifetime due to appropriately placed forces that lessen repeat compression and stressing of the individual components (e.g. the energizing element(s), jacket) due to vibration or actuation of the seal or other components within the assembly. Further, the seal described according to embodiments herein may prevent seal defor-mation under low and high cyclic pressure cycles. As a result, the lifetime of the components and the seal itself may be improved and overall leakage may be lessened.

Many different aspects and embodiments are possible. Some of those aspects and embodiments are described below. After reading this specification, skilled artisans will appreciate that those aspects and embodiments are only illustrative and do not limit the scope of the present inven-tion. Embodiments may be in accordance with any one or more of the items as listed below.

Embodiment 1: An energizing element comprising: an energizing element body oriented about a central axis, the energizing element body defining an inner radius, IR, and an outer radius, OR, wherein the difference between the outer radius and the inner radius defines an adjusted width, W, of the energizing element body, wherein the inner radius and the outer radius determine an average radius, R, of the energizing element body about the central axis, wherein the energizing element body defines an aspect ratio, W/R, wherein W/R>0.1, wherein the energizing element body has a maximum linear contact length on the inner radius, $L_{IR}$, wherein the energizing element body has a perimeter on the inner radius, $P_{IR}$, and $L_{IR}/P_{IR}>0.80$, wherein the energizing element body has a maximum linear contact length on the outer radius, $L_{OR}$, wherein the energizing element body has a perimeter on the outer radius, $P_{OR}$, and $L_{OR}/P_{OR}>0.55$, and wherein the adjusted width is less than 5 mm.

Embodiment 2: An energizing element comprising: an energizing element body oriented about a central axis, the energizing element body defining an inner radius, IR, and an outer radius, OR, wherein the difference between the outer radius and the inner radius defines an adjusted width, W, of the energizing element body, wherein the inner radius and the outer radius determine an average radius, R, of the energizing element body about the central axis, wherein the energizing element body defines an aspect ratio, W/R, wherein W/R>0.2, wherein the energizing element body has a maximum linear contact length on the inner radius, $L_{IR}$, wherein the energizing element body has a perimeter on the inner radius, $P_{IR}$, and $L_{IR}/P_{IR}>0.74$, wherein the energizing element body has a maximum linear contact length on the outer radius, $L_{OR}$, wherein the energizing element body has a perimeter on the outer radius, $P_{OR}$, and $L_{OR}/P_{OR}>0.38$, and wherein the adjusted width is less than 5 mm.

Embodiment 3: A seal comprising: an annular jacket comprising a body defining an annular recess; and an energizing element disposed within the annular recess, the energizing element comprising: an energizing element body oriented about a central axis, the energizing element body defining an inner radius, IR, and an outer radius, OR, wherein the difference between the outer radius and the inner radius defines an adjusted width, W, of the energizing element body, wherein the inner radius and the outer radius determine an average radius, R, of the energizing element body about the central axis, wherein the energizing element body defines an aspect ratio, W/R, wherein W/R>0.1, wherein the energizing element body has a maximum linear contact length on the inner radius, $L_{IR}$, wherein the energizing element body has a perimeter on the inner radius, $P_{IR}$, and $L_{IR}/P_{IR}>0.80$, wherein the energizing element body has a maximum linear contact length on the outer radius, $L_{OR}$, wherein the energizing element body has a perimeter on the outer radius, $P_{OR}$, and $L_{OR}/P_{OR}>0.55$, and wherein the adjusted width is less than 5 mm.

Embodiment 4: A seal comprising: an annular jacket comprising a body defining an annular recess; and an energizing element disposed within the annular recess, the energizing element comprising: an energizing element body oriented about a central axis, the energizing element body defining an inner radius, IR, and an outer radius, OR, wherein the difference between the outer radius and the inner radius defines an adjusted width, W, of the energizing element body, wherein the inner radius and the outer radius determine an average radius, R, of the energizing element body about the central axis, wherein the energizing element body defines an aspect ratio, W/R, wherein W/R>0.2, wherein the energizing element body has a maximum linear contact length on the inner radius, $L_{IR}$, wherein the energizing element body has a perimeter on the inner radius, $P_{IR}$, and $L_{IR}/P_{IR}>0.74$, wherein the energizing element body has a maximum linear contact length on the outer radius, $L_{OR}$, wherein the energizing element body has a perimeter on the outer radius, $P_{OR}$, and $L_{OR}/P_{OR}>0.38$, and wherein the adjusted width is less than 5 mm.

Embodiment 5: A method comprising: providing a filament; and manipulating the filament to form an energizing element body oriented about a central axis, the energizing element body defining an inner radius, IR, and an outer radius, OR, wherein the difference between the outer radius and the inner radius defines an adjusted width, W, of the energizing element body, wherein the inner radius and the outer radius determine an average radius, R, of the energizing element body about the central axis, wherein the energizing element body defines an aspect ratio, W/R, wherein W/R>0.1, wherein the energizing element body has a maximum linear contact length on the inner radius, $L_{IR}$, wherein the energizing element body has a perimeter on the inner radius, $P_{IR}$, and $L_{IR}/P_{IR}>0.80$, wherein the energizing element body has a maximum linear contact length on the outer radius, $L_{OR}$, wherein the energizing element body has a perimeter on the outer radius, $P_{OR}$, and $L_{OR}/P_{OR}>0.55$, and wherein the adjusted width is less than 5 mm.

Embodiment 6: A method comprising: providing a filament; and manipulating the filament to form an energizing element body oriented about a central axis, the energizing element body defining an inner radius, IR, and an outer radius, OR, wherein the difference between the outer radius and the inner radius defines an adjusted width, W, of the energizing element body, wherein the inner radius and the outer radius determine an average radius, R, of the energizing element body about the central axis, wherein the energizing element body defines an aspect ratio, W/R, wherein W/R>0.2, wherein the energizing element body has a maximum linear contact length on the inner radius, $L_{IR}$, wherein the energizing element body has a perimeter on the inner radius, $P_{IR}$, and $L_{IR}/P_{IR}>0.74$, wherein the energizing element body has a maximum linear contact length on the outer radius, $L_{OR}$, wherein the energizing element body has a perimeter on the outer radius, $P_{OR}$, and $L_{OR}/P_{OR}>0.38$, and wherein the adjusted width is less than 5 mm.

Embodiment 7: A method comprising: providing an additive manufacturing process; and manipulating a powder or an extruded or a heat-curable or photo-curable resin or liquid to form an energizing element body oriented about a central axis, the energizing element body defining an inner radius, IR, and an outer radius, OR, wherein the difference between the outer radius and the inner radius defines an adjusted width, W, of the energizing element body, wherein the inner radius and the outer radius determine an average radius, R, of the energizing element body about the central axis, wherein the energizing element body defines an aspect ratio, W/R, wherein W/R>0.1, wherein the energizing element body has a maximum linear contact length on the inner radius, $L_{IR}$, wherein the energizing element body has a perimeter on the inner radius, $P_{IR}$, and $L_{IR}/P_{IR}>0.80$, wherein the energizing element body has a maximum linear contact length on the outer radius, $L_{OR}$, wherein the energizing element body has a perimeter on the outer radius, $P_{OR}$, and $L_{OR}/P_{OR}>0.55$, and wherein the adjusted width is less than 5 mm.

Embodiment 8: A method comprising: providing an additive manufacturing process; and manipulating a powder or an extruded or a heat-curable or photo-curable resin or liquid to form an energizing element body oriented about a central axis, the energizing element body defining an inner radius, IR, and an outer radius, OR, wherein the difference between the outer radius and the inner radius defines an adjusted width, W, of the energizing element body, wherein the inner radius and the outer radius determine an average radius, R, of the energizing element body about the central axis, wherein the energizing element body defines an aspect ratio, W/R, wherein W/R>0.2, wherein the energizing element body has a maximum linear contact length on the inner radius, $L_{IR}$, wherein the energizing element body has a perimeter on the inner radius, $P_{IR}$, and $L_{IR}/P_{IR}>0.74$, wherein the energizing element body has a maximum linear contact length on the outer radius, $L_{OR}$, wherein the energizing element body has a perimeter on the outer radius, $P_{OR}$, and $L_{OR}/P_{OR}>0.38$, and wherein the adjusted width is less than 5 mm.

Embodiment 9: A method comprising: providing an injection molding method; and manipulating a melt processable polymer or a metal powder loaded resin, or a ceramic powder loaded resin, or a molten metal to form an energizing element body oriented about a central axis, the energizing element body defining an inner radius, IR, and an outer radius, OR, wherein the difference between the outer radius and the inner radius defines an adjusted width, W, of the energizing element body, wherein the inner radius and the outer radius determine an average radius, R, of the energizing element body about the central axis, wherein the energizing element body defines an aspect ratio, W/R, wherein W/R>0.1, wherein the energizing element body has a maximum linear contact length on the inner radius, $L_{IR}$, wherein the energizing element body has a perimeter on the inner radius, $P_{IR}$, and $L_{IR}/P_{IR}>0.80$, wherein the energizing element body has a maximum linear contact length on the outer radius, $L_{OR}$, wherein the energizing element body has a perimeter on the outer radius, $P_{OR}$, and $L_{OR}/P_{OR}>0.55$, and wherein the adjusted width is less than 5 mm.

Embodiment 10: A method comprising: providing an injection molding method; and manipulating a melt processable polymer or a metal powder loaded resin, or a ceramic powder loaded resin, or a molten metal to form an energizing element body oriented about a central axis, the energizing element body defining an inner radius, IR, and an outer radius, OR, wherein the difference between the outer radius and the inner radius defines an adjusted width, W, of the energizing element body, wherein the inner radius and the outer radius determine an average radius, R, of the energizing element body about the central axis, wherein the energizing element body defines an aspect ratio, W/R, wherein W/R>0.2, wherein the energizing element body has a maximum linear contact length on the inner radius, $L_{IR}$, wherein the energizing element body has a perimeter on the inner radius, $P_{IR}$, and $L_{IR}/P_{IR}>0.74$, wherein the energizing element body has a maximum linear contact length on the outer radius, $L_{OR}$, wherein the energizing element body has a perimeter on the outer radius, $P_{OR}$, and $L_{OR}/P_{OR}>0.38$, and wherein the adjusted width is less than 5 mm.

Embodiment 11: A method comprising: providing a bulk metallic or ceramic or polymer shape; or a welded metallic 3D shape, and machining, lathing or cutting to form an energizing element body oriented about a central axis, the energizing element body defining an inner radius, IR, and an outer radius, OR, wherein the difference between the outer radius and the inner radius defines an adjusted width, W, of the energizing element body, wherein the inner radius and the outer radius determine an average radius, R, of the energizing element body about the central axis, wherein the energizing element body defines an aspect ratio, W/R, wherein W/R>0.1, wherein the energizing element body has a maximum linear contact length on the inner radius, $L_{IR}$, wherein the energizing element body has a perimeter on the inner radius, $P_{IR}$, and $L_{IR}/P_{IR}>0.80$, wherein the energizing element body has a maximum linear contact length on the outer radius, $L_{OR}$, wherein the energizing element body has a perimeter on the outer radius, $P_{OR}$, and $L_{OR}/P_{OR}>0.55$, and wherein the adjusted width is less than 5 mm.

Embodiment 12: A method comprising: providing a bulk metallic or ceramic or polymer shape or a welded metallic 3D shape, and machining or lathing or cutting to form an energizing element body oriented about a central axis, the energizing element body defining an inner radius, IR, and an outer radius, OR, wherein the difference between the outer radius and the inner radius defines an adjusted width, W, of the energizing element body, wherein the inner radius and the outer radius determine an average radius, R, of the energizing element body about the central axis, wherein the energizing element body defines an aspect ratio, W/R, wherein W/R>0.2, wherein the energizing element body has a maximum linear contact length on the inner radius, $L_{IR}$, wherein the energizing element body has a perimeter on the inner radius, $P_{IR}$, and $L_{IR}/P_{IR}>0.74$, wherein the energizing element body has a maximum linear contact length on the outer radius, $L_{OR}$, wherein the energizing element body has a perimeter on the outer radius, $P_{OR}$, and $L_{OR}/P_{OR}>0.38$, and wherein the adjusted width is less than 5 mm.

Embodiment 13: A method comprising: providing a flat non-straight metallic ribbon; and manipulating the ribbon to form an energizing element body oriented about a central axis, the energizing element body defining an inner radius, IR, and an outer radius, OR, wherein the difference between the outer radius and the inner radius defines an adjusted width, W, of the energizing element body, wherein the inner radius and the outer radius determine an average radius, R, of the energizing element body about the central axis, wherein the energizing element body defines an aspect ratio, W/R, wherein W/R>0.1, wherein the energizing element body has a maximum linear contact length on the inner radius, $L_{IR}$, wherein the energizing element body has a perimeter on the inner radius, $P_{IR}$, and $L_{IR}/P_{IR}>0.80$, wherein the energizing element body has a maximum linear contact length on the outer radius, $L_{OR}$, wherein the energizing element body has a perimeter on the outer radius, $P_{OR}$, and $L_{OR}/P_{OR}>0.55$, and wherein the adjusted width is less than 5 mm.

Embodiment 14: A method comprising: providing a flat non-straight metallic ribbon; and manipulating the ribbon to form an energizing element body oriented about a central axis, the energizing element body defining an inner radius, IR, and an outer radius, OR, wherein the difference between the outer radius and the inner radius defines an adjusted width, W, of the energizing element body, wherein the inner radius and the outer radius determine an average radius, R, of the energizing element body about the central axis, wherein the energizing element body defines an aspect ratio, W/R, wherein W/R>0.2, wherein the energizing element body has a maximum linear contact length on the inner radius, $L_{IR}$, wherein the energizing element body has a perimeter on the inner radius, $P_{IR}$, and $L_{IR}/P_{IR}>0.74$, wherein the energizing element body has a maximum linear contact length on the outer radius, $L_{OR}$, wherein the energizing element body has a perimeter on the outer radius, $P_{OR}$, and $L_{OR}/P_{OR}>0.38$, and wherein the adjusted width is less than 5 mm.

Embodiment 15: A method according to any of the preceding embodiments 5, 7, 9, 11, 13, providing any article from those embodiments; and coating to form an energizing element body oriented about a central axis, the energizing element body defining an inner radius, IR, and an outer radius, OR, wherein the difference between the outer radius and the inner radius defines an adjusted width, W, of the energizing element body, wherein the inner radius and the outer radius determine an average radius, R, of the energizing element body about the central axis, wherein the energizing element body defines an aspect ratio, W/R, wherein W/R>0.1, wherein the energizing element body has a maximum linear contact length on the inner radius, $L_{IR}$, wherein the energizing element body has a perimeter on the inner radius, $P_{IR}$, and $L_{IR}/P_{IR}>0.80$, wherein the energizing element body has a maximum linear contact length on the outer radius, $L_{OR}$, wherein the energizing element body has a perimeter on the outer radius, $P_{OR}$, and $L_{OR}/P_{OR}>0.55$, and wherein the adjusted width is less than 5 mm.

Embodiment 16: A method according to any of the preceding embodiments 6, 8, 10, 12, 14, providing any article from those embodiments; and coating to form an energizing element body oriented about a central axis, the energizing element body defining an inner radius, IR, and an outer radius, OR, wherein the difference between the outer radius and the inner radius defines an adjusted width, W, of the energizing element body, wherein the inner radius and the outer radius determine an average radius, R, of the energizing element body about the central axis, wherein the energizing element body defines an aspect ratio, W/R, wherein W/R>0.2, wherein the energizing element body has a maximum linear contact length on the inner radius, $L_{IR}$, wherein the energizing element body has a perimeter on the inner radius, $P_{IR}$, and $L_{IR}/P_{IR}>0.74$, wherein the energizing element body has a maximum linear contact length on the outer radius, $L_{OR}$, wherein the energizing element body has a perimeter on the outer radius, $P_{OR}$, and $L_{OR}/P_{OR}>0.38$, and wherein the adjusted width is less than 5 mm.

Embodiment 17: The energizing element, seal, or method of any of the preceding embodiments 1-16, wherein the energizing element is a polymeric material. Exemplary polymers include, acrylates, polytetrafluoroethylene (PTFE), fluorinated ethylene-propylene (FEP), polyvinylidenefluoride (PVDF), polychlorotrifluoroethylene (PCTFE), ethylene chlorotrifluoroethylene (ECTFE), perfluoroalkoxy alkane (PFA), polyacetal, polybutylene terephthalate (PBT), polyethylene terephthalate (PET), polyimide (PI), polyetherimide, polyetheretherketone (PEEK), polyethylene (PE), polysulfone, polyamide (PA), polyphenylene oxide, polyphenylene sulfide (PPS), polyurethane, polyester, liquid crystal polymers (LCP), or any combination thereof.

Embodiment 18: The energizing element, seal, or method of any of the preceding embodiments 1-17, wherein the energizing element is a metal material. Exemplary metals include steel, spring steel, stainless steel, such as 301 Stainless Steel, 302/304 Stainless Steel, 316 Stainless Steel, or 17-7 Stainless Steel, bronze, copper, molybdenum, cobalt, iron, chromium, copper, manganese, titanium, zirconium, Monel, Inconel, aluminum, carbon, tungsten, Elgiloy, Hastelloy, or an amorphous metal compound, and oil tempered chrome silicon or vanadium.

Embodiment 19: The energizing element, seal, or method of any of the preceding embodiments 1-18, wherein the energizing element is an oxide or non-oxide ceramic.

Embodiment 20: The energizing element, seal, or method of any of embodiments 1-19, wherein the energizing element body comprises multiple tabs oriented about the central axis.

Embodiment 21: The energizing element, seal, or method of embodiment 20, wherein at least one tab is oriented radially inward.

Embodiment 22: The energizing element, seal, or method of embodiment 20, wherein at least one tab is oriented radially outward.

Embodiment 23: The energizing element, seal, or method of any of embodiments 1-22, wherein the energizing element body comprises a ribbon spring comprising a plurality of circumferential coils oriented about the central axis.

Embodiment 24: The energizing element, seal, or method of embodiment 23, wherein the plurality of circumferential coils all have generally the same cross-sectional shape.

Embodiment 25: The energizing element, seal, or method of any of embodiments 1-24, wherein the energizing element body comprises a U-shaped cross-sectional spring oriented about the central axis.

Embodiment 26: The energizing element, seal, or method of any of embodiments 1-25, wherein the energizing element body comprises a V-shaped cross-sectional spring oriented about the central axis.

Embodiment 27: The energizing element, seal, or method of any of embodiments 1-26, wherein the energizing element body comprises an O-shaped cross-sectional spring oriented about the central axis.

Embodiment 28: The energizing element, seal, or method of any of embodiments 1-27, wherein the energizing element body is not welded.

Embodiment 29: The energizing element, seal, or method of any of embodiments 1-28, wherein the energizing element body defines a plurality of contact features comprising at least one inner contact feature on the inner radius and at least one outer contact feature on the outer radius.

Embodiment 30: The energizing element, seal, or method of embodiment 29, wherein the plurality of contact features is less than 20, less than 15, or less than 10.

Embodiment 31: The energizing element, seal, or method of embodiment 29, wherein the cross-sectional shape of the at least one inner contact feature is different than the cross-sectional shape of the at least one outer contact feature.

Embodiment 32: The energizing element, seal, or method of any of embodiments 1-31, wherein the energizing element body comprises a plurality of oscillations.

Embodiment 33: The energizing element, seal, or method of embodiment 32, wherein the plurality of oscillations comprise internal oscillations and external oscillations.

Embodiment 34: The energizing element, seal, or method of embodiment 32, wherein the energizing element body defines an angle α in a radial direction between neighboring oscillations, wherein a is between 0-180°.

Embodiment 35: The energizing element, seal, or method of embodiment 32, wherein at least one oscillation of the plurality of oscillations has a circular cross-section in the axial direction.

Embodiment 36: The energizing element, seal, or method of embodiment 32, wherein at least one oscillation of the plurality of oscillations has an oval cross-section in the axial direction.

Embodiment 37: The energizing element, seal, or method of embodiment 32, wherein at least one oscillation of the plurality of oscillations has a polygonal cross-section in the axial direction.

Embodiment 38: The energizing element, seal, or method of any of embodiments 1-37, wherein the energizing element has a spring rate of between CC and DD.

Embodiment 39: The energizing element, seal, or method of any of embodiments 1-38, wherein the energizing element comprises a flat, rectangular, square, or keystone cross-sectional wire.

Embodiment 40: The energizing element, seal, or method of any of embodiments 1-39, wherein the energizing element comprises a circular cross-sectional wire.

Embodiment 41: The energizing element, seal, or method of any of embodiments 1-40, wherein the energizing element comprises a polymer.

Embodiment 42: The energizing element, seal, or method of any of embodiments 1-41, wherein the energizing element comprises a metal.

Embodiment 43: The energizing element or seal of embodiment 42, wherein the energizing element comprises a spring steel.

Embodiment 44: The energizing element, seal, or method of any of embodiments 1-43, wherein the energizing element comprises a ceramic.

Embodiment 45: The energizing element, seal, or method of any of embodiments 1-44, wherein the energizing element comprises a plurality of energizing elements.

Embodiment 46: The energizing element, seal, or method of embodiment 45, wherein the plurality of energizing elements are stacked upon each other in the axial direction.

Embodiment 47: The seal of any of embodiments 3-4, wherein the seal is a face seal.

Embodiment 48: The seal of any of embodiments 3-4, wherein the seal is an axial seal.

Embodiment 49: The method of any of embodiments 5-6, wherein manipulating the filament comprises a process including at least one of 3-D printing, extrusion, injection molding, or a combination thereof.

Note that not all of the features described above are required, that a portion of a specific feature may not be required, and that one or more features may be provided in addition to those described. Still further, the order in which features are described is not necessarily the order in which the features are installed.

Certain features are, for clarity, described herein in the context of separate embodiments, may also be provided in combination in a single embodiment. Conversely, various features that are, for brevity, described in the context of a single embodiment, may also be provided separately or in any subcombinations.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or any change may be made without departing from the scope of the disclosure. Accordingly, the disclosure is to be regarded as illustrative rather than restrictive.

What is claimed is:

1. An energizing element comprising:

an energizing element body oriented about a central axis, the energizing element body defining an inner radius (IR) and an outer radius (OR), wherein the difference between the outer radius and the inner radius defines an adjusted width (W) of the energizing element body, and wherein energizing element body comprises an annular filament oriented about the central axis, wherein the inner radius and the outer radius determine an average radius (R) of the energizing element body about the central axis, wherein the energizing element body defines an aspect ratio (W/R), wherein W/R>0.1, wherein the energizing element body has a maximum linear contact length on the inner radius ($L_{IR}$), wherein the energizing element body has a perimeter on the inner radius ($P_{IR}$), and $L_{IR}/P_{IR}>0.80$, wherein the energizing element body has a maximum linear contact length on the outer radius ($L_{OR}$), wherein the energizing element body has a perimeter on the outer radius ($P_{OR}$), and $L_{OR}/P_{OR}>0.55$, and wherein the adjusted width is less than 5 mm.

2. An energizing element comprising:

an energizing element body oriented about a central axis, the energizing element body defining an inner radius (IR) and an outer radius (OR), wherein the difference between the outer radius and the inner radius defines an adjusted width (W) of the energizing element body, and wherein energizing element body comprises an annular filament oriented about the central axis, wherein the inner radius and the outer radius determine an average radius (R) of the energizing element body about the central axis, wherein the energizing element body defines an aspect ratio (W/R), wherein W/R>0.2, wherein the energizing element body has a maximum linear contact length on the inner radius ($L_{IR}$), wherein the energizing element body has a perimeter on the inner radius ($P_{IR}$), and $L_{IR}/P_{IR}>0.74$, wherein the energizing element body has a maximum linear contact length on the outer radius ($L_{OR}$), wherein the energizing element body has a perimeter on the outer radius ($P_{OR}$), and $L_{OR}/P_{OR}>0.38$, and wherein the adjusted width is less than 5 mm.

3. A seal comprising:

an annular jacket comprising a body defining an annular recess; and an energizing element disposed within the annular recess, the energizing element comprising:

an energizing element body oriented about a central axis, the energizing element body defining an inner radius (IR) and an outer radius (OR), wherein the difference between the outer radius and the inner radius defines an adjusted width (W) of the energizing element body, and wherein energizing element body comprises an annular filament oriented about the central axis, wherein the inner radius and the outer radius determine an average radius (R) of the energizing element body about the central axis, wherein the energizing element body defines an aspect ratio (W/R), wherein W/R>0.1, wherein the energizing element body has a maximum linear contact length on the inner radius ($L_{IR}$), wherein the energizing element body has a perimeter on the inner radius ($P_{IR}$), and $L_{IR}/P_{IR}>0.80$, wherein the energizing element body has a maximum linear contact length on the outer radius ($L_{OR}$), wherein the energizing element body has a perimeter on the outer radius ($P_{OR}$), and $L_{OR}/P_{OR}>0.38$, and wherein the adjusted width is less than 5 mm.

4. The energizing element of claim 1, wherein the energizing element is a polymeric material selected from the group consisting of acrylates, polytetrafluoroethylene (PTFE), fluorinated ethylene-propylene (FEP), polyvinylidenfluoride (PVDF), polychlorotrifluoroethylene (PCTFE), ethylene chlorotrifluoroethylene (ECTFE), perfluoroalkoxy alkane (PFA), polyacetal, polybutylene terephthalate (PBT), polyethylene terephthalate (PET), polyimide (PI), polyetherimide, polyetheretherketone (PEEK), polyethylene (PE), polysulfone, polyamide (PA), polyphenylene oxide, polyphenylene sulfide (PPS), polyurethane, polyester, liquid crystal polymers (LCP), or any combination thereof.

5. The energizing element of claim 1, wherein the energizing element is a metal material selected from the group consisting of steel, spring steel, stainless steel, such as 301 Stainless Steel, 302/304 Stainless Steel, 316 Stainless Steel, or 17-7 Stainless Steel, bronze, copper, molybdenum, cobalt, iron, chromium, copper, manganese, titanium, zirconium, Monel, Inconel, aluminum, carbon, tungsten, Elgiloy, Hastelloy, or an amorphous metal compound, and oil tempered chrome silicon or vanadium.

6. The energizing element of claim 1, wherein the energizing element body comprises multiple tabs oriented about the central axis.

7. The energizing element of claim 6, wherein at least one tab is oriented radially inward.

8. The energizing element of claim 6, wherein at least one tab is oriented radially outward.

9. The energizing element of claim 1, wherein the energizing element body comprises a ribbon spring comprising a plurality of circumferential coils oriented about the central axis.

10. The energizing element of claim 1, wherein the energizing element body comprises a U-shaped cross-sectional spring oriented about the central axis.

11. The energizing element of claim 1, wherein the energizing element body comprises a V-shaped cross-sectional spring oriented about the central axis.

12. The energizing element of claim 1, wherein the energizing element body comprises an O-shaped cross-sectional spring oriented about the central axis.

13. The energizing element of claim 1, wherein the energizing element body is not welded.

14. The energizing element of claim 1, wherein the energizing element body defines a plurality of contact features comprising at least one inner contact feature on the inner radius and at least one outer contact feature on the outer radius.

15. The energizing element of claim 1, wherein the plurality of contact features is less than 20.

16. The energizing element of claim 15, wherein the cross-sectional shape of the at least one inner contact feature is different than the cross-sectional shape of the at least one outer contact feature.

17. The energizing element of claim 1, wherein the energizing element body comprises a plurality of oscillations, wherein each oscillation in the plurality of oscillations travels from one transversal of a circumferentially oriented line perpendicular and circumferential to the central axis at a fixed point in the filament to the neighboring transversal of the circumferentially oriented line perpendicular to the central axis at a neighboring point in the filament.

18. The energizing element of claim 17, wherein the plurality of oscillations comprise internal oscillations and external oscillations.

19. The energizing element of claim 1, wherein the energizing element comprises a plurality of energizing elements.

20. The energizing element of claim 19, wherein the plurality of energizing elements are stacked upon each other in the axial direction.

* * * * *